US010640171B2

(12) United States Patent
Hamed

(10) Patent No.: US 10,640,171 B2
(45) Date of Patent: May 5, 2020

(54) AUTOMATIC BICYCLE SHIFTER AND USER INTERFACE

(71) Applicant: Hazem Nihad Hamed, Huntington Beach, CA (US)

(72) Inventor: Hazem Nihad Hamed, Huntington Beach, CA (US)

( * ) Notice: Subject to any disclaimer, the term of this patent is extended or adjusted under 35 U.S.C. 154(b) by 0 days.

(21) Appl. No.: 16/363,205

(22) Filed: Mar. 25, 2019

(65) Prior Publication Data

US 2019/0263474 A1   Aug. 29, 2019

(51) Int. Cl.
*B62M 25/00* (2006.01)
*B62M 25/08* (2006.01)
*B62M 9/132* (2010.01)
*B62M 9/122* (2010.01)

(52) U.S. Cl.
CPC ............ *B62M 25/00* (2013.01); *B62M 25/08* (2013.01); *B62M 9/122* (2013.01); *B62M 9/132* (2013.01)

(58) Field of Classification Search
CPC .... B62M 25/08; B62M 9/122; B62M 25/045; B62M 9/132; B62M 25/04
USPC .......................................................... 474/78
See application file for complete search history.

(56) References Cited

U.S. PATENT DOCUMENTS

| | | | | |
|---|---|---|---|---|
| 4,490,127 A * | 12/1984 | Matsumoto | ............ | B62M 9/122 280/236 |
| 5,059,158 A * | 10/1991 | Bellio | ...................... | B62M 9/12 474/103 |
| 5,213,548 A * | 5/1993 | Colbert | .................. | B62M 25/08 280/238 |
| 5,254,044 A * | 10/1993 | Anderson | .............. | B62M 9/122 474/103 |
| 5,261,858 A * | 11/1993 | Browning | .............. | B62M 9/122 474/69 |
| 5,266,065 A * | 11/1993 | Ancarani Restelli | .... | B62J 99/00 474/78 |
| 5,357,177 A * | 10/1994 | Fey | ......................... | B62M 25/08 318/3 |
| 5,551,315 A * | 9/1996 | Pikoulas | ................ | B62M 9/122 280/236 |
| 5,599,244 A * | 2/1997 | Ethington | .............. | B62M 9/122 280/261 |
| 6,047,230 A * | 4/2000 | Spencer | ................. | B62M 9/123 474/70 |
| 6,352,486 B1 * | 3/2002 | Wesling | ................. | B62M 9/122 474/70 |
| 6,367,833 B1 * | 4/2002 | Horiuchi | ................ | B62M 9/122 280/260 |
| 6,543,799 B2 * | 4/2003 | Miyoshi | ................. | B62K 25/04 280/283 |
| 6,634,971 B2 * | 10/2003 | Campagnolo | .......... | B62M 9/122 474/78 |
| 6,682,087 B1 * | 1/2004 | Takeda | ..................... | B62J 99/00 280/238 |

(Continued)

*Primary Examiner* — Henry Y Liu

(57) ABSTRACT

An automatic bicycle drivetrain shifting apparatus comprising a bicycle drive chain derailleur powered by a servo gearmotor slaved to an electronic control system and controlled through a highly adaptable user interface serving to automatically alternate drive chain position between available bicycle drive sprockets under user defined shifting criteria adaptable in real time to rider conditioning, comfort level and road conditions thereby alleviating manual shifting tasks and achieving optimal pedal rate and effort settings for the rider.

28 Claims, 18 Drawing Sheets

(56) References Cited

U.S. PATENT DOCUMENTS

| | | | | |
|---|---|---|---|---|
| 6,837,505 B2* | 1/2005 | Fujii | B62M 25/08 | 280/260 |
| 6,877,755 B2* | 4/2005 | Takamoto | B62M 25/04 | 280/260 |
| 6,884,190 B2* | 4/2005 | Takebayashi | B62M 9/10 | 474/70 |
| 6,931,958 B2* | 8/2005 | Takeda | B62M 25/08 | 474/70 |
| 6,988,739 B2* | 1/2006 | Guderzo | B62M 9/122 | 280/259 |
| 7,086,974 B2* | 8/2006 | Dal Pra | B62M 9/122 | 474/78 |
| 7,144,027 B2* | 12/2006 | Kitamura | B62M 25/045 | 280/260 |
| 7,184,872 B2* | 2/2007 | Guderzo | B62M 9/122 | 474/116 |
| 7,207,912 B2* | 4/2007 | Takeda | B62M 25/045 | 280/260 |
| 7,223,189 B2* | 5/2007 | Guderzo | B62J 99/00 | 280/259 |
| 7,288,038 B2* | 10/2007 | Takeda | B62M 9/122 | 474/80 |
| 7,290,458 B2* | 11/2007 | Fukuda | B62M 9/122 | 74/82 |
| 7,306,531 B2* | 12/2007 | Ichida | B62M 9/122 | 474/70 |
| 7,373,232 B2* | 5/2008 | Guderzo | B62M 9/122 | 474/116 |
| 7,547,263 B2* | 6/2009 | Fukuda | B62M 25/08 | 280/260 |
| 7,563,186 B2* | 7/2009 | Mercat | B62M 9/12 | 474/70 |
| 8,360,909 B2* | 1/2013 | Ichida | B62M 25/08 | 474/69 |
| 8,781,663 B2* | 7/2014 | Watarai | B62M 6/45 | 701/22 |
| 8,874,338 B2* | 10/2014 | Miglioranza | B62M 9/122 | 180/218 |
| 8,886,417 B2* | 11/2014 | Jordan | B62M 25/08 | 200/61.88 |
| 8,909,424 B2* | 12/2014 | Jordan | B62K 25/08 | 701/36 |
| 8,998,756 B2* | 4/2015 | Ichida | B62K 23/06 | 474/70 |
| 9,234,580 B1* | 1/2016 | Usui | B62M 25/08 | |
| 9,284,018 B2* | 3/2016 | Tauchi | B62M 25/08 | |
| 9,975,603 B2* | 5/2018 | Bortolozzo | B62M 25/08 | |
| 10,167,056 B2* | 1/2019 | Hashimoto | B62M 9/122 | |

* cited by examiner

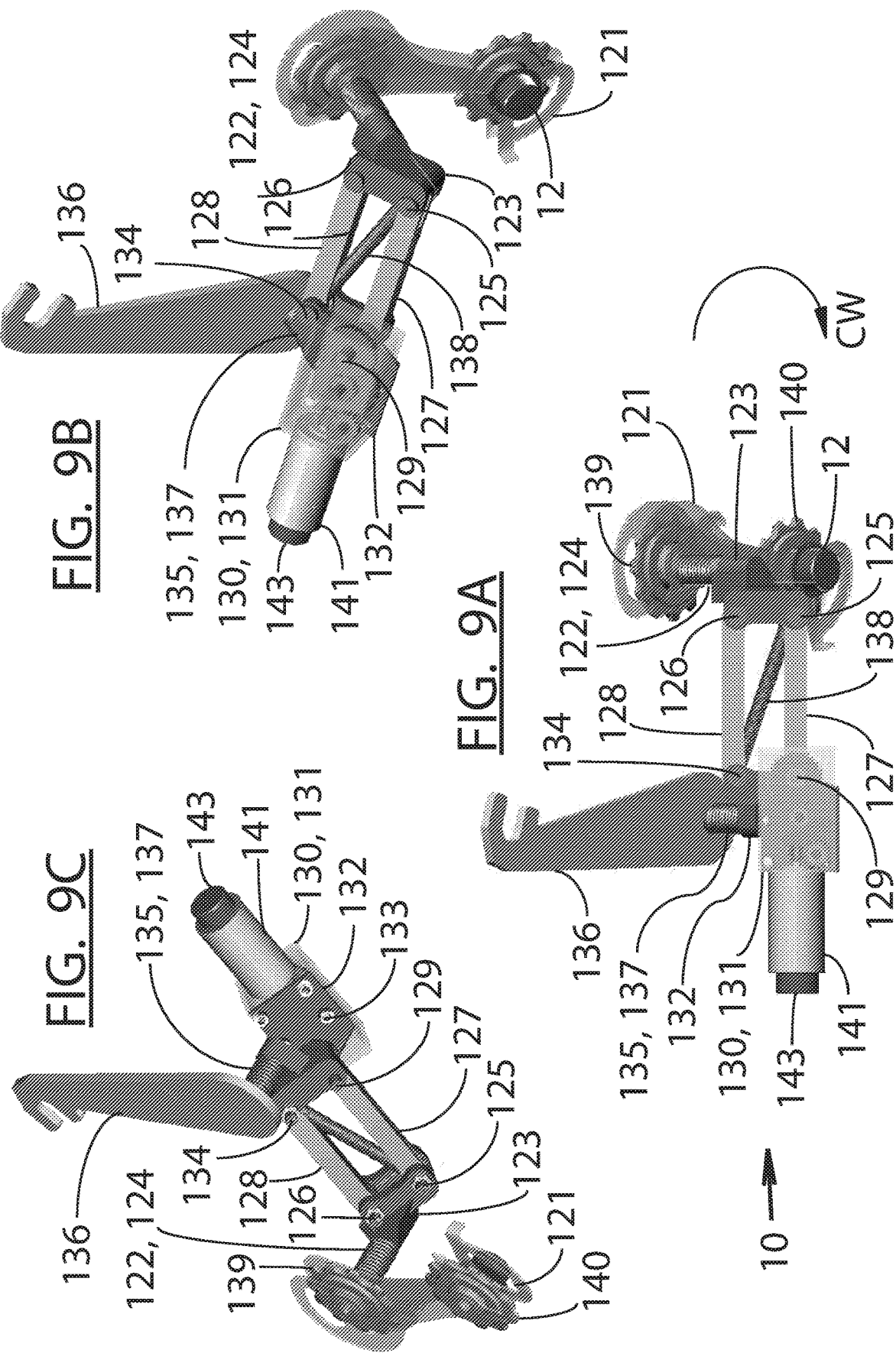

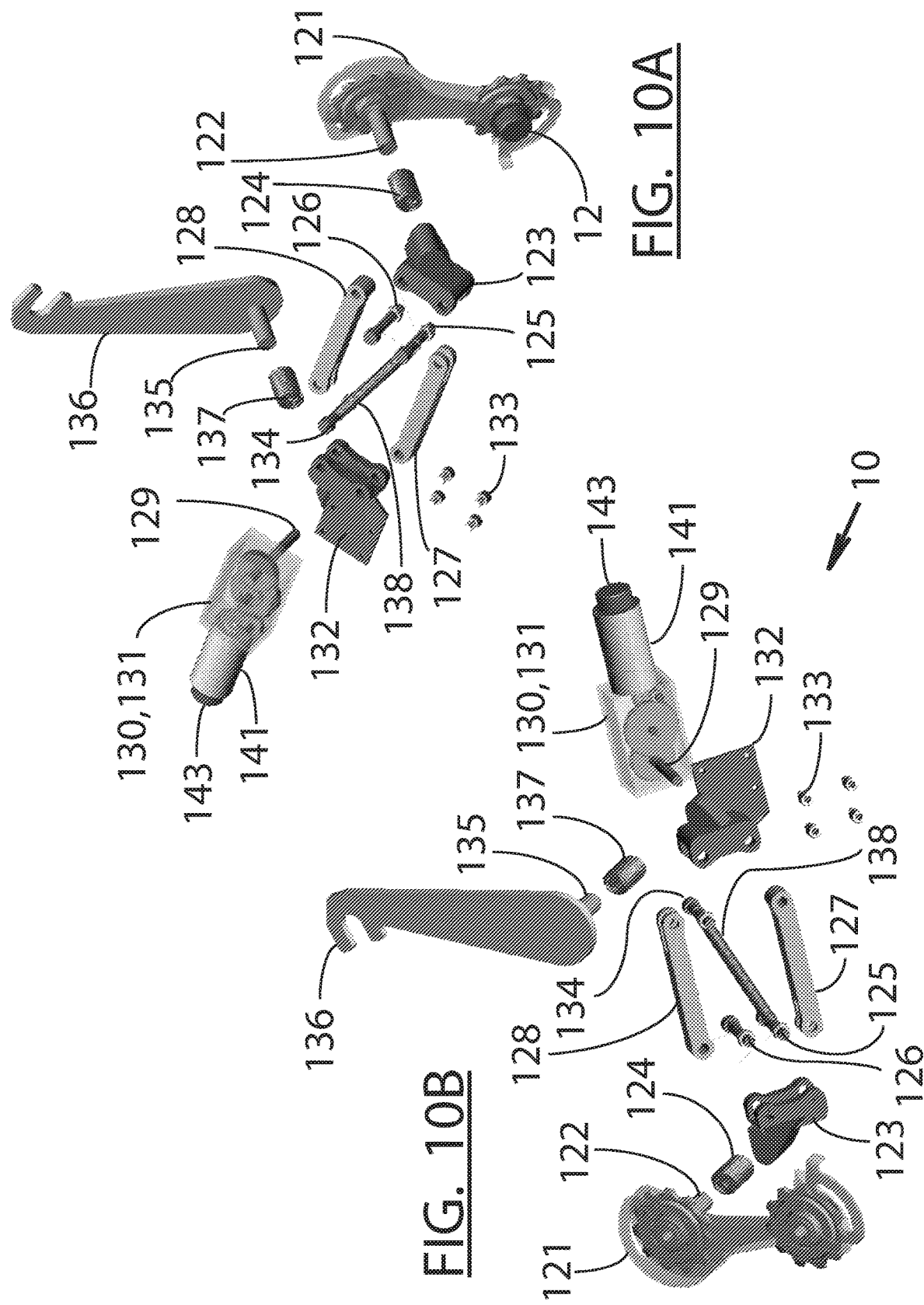

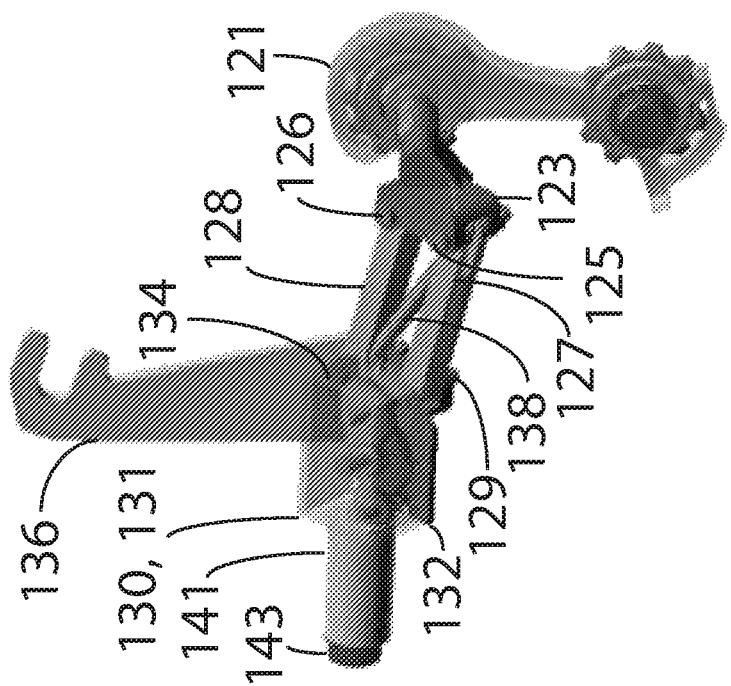
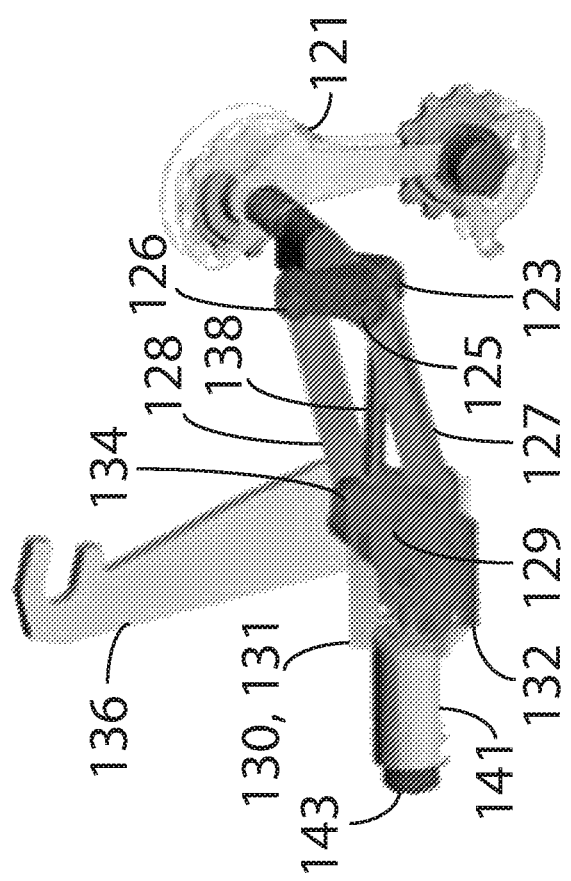
FIG. 12A
FIG. 12B

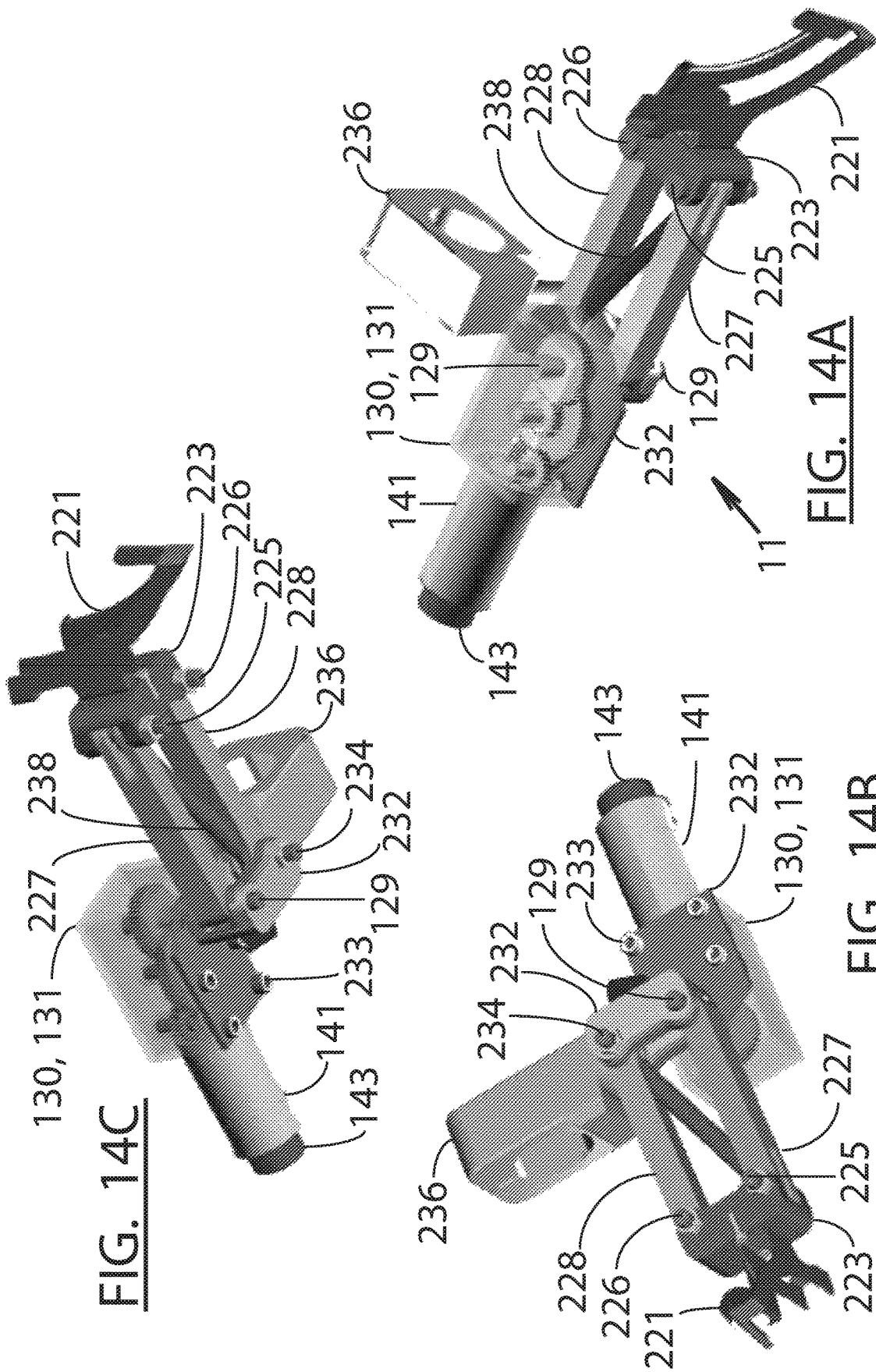

AUTOMATIC BICYCLE SHIFTER AND USER INTERFACE

CROSS-REFERENCE TO RELATED APPLICATIONS

Not Applicable

FEDERALLY SPONSORED RESEARCH

Not Applicable

SEQUENCE LISTING OR PROGRAM

Not Applicable

FIELD OF THE INVENTION

The disclosed invention relates to the cycling transportation and sporting industry, specifically to modern bicycle designs typically making use of front and rear drive chain derailleurs serving to alternate drive chain position between different ratio front and rear drive sprockets through linkage to a set of rider control levers permitting the rider to achieve an optimal drivetrain ratio through selection of an adequate combination of front and rear drive sprockets, thereby facilitating a comfortable pedaling rate and effort thereof depending on desired road speed, rider conditioning, road inclination and other circumstantial conditions.

BACKGROUND OF THE INVENTION

Bicycles have existed for many years serving throughout as transportation and sporting means. Over the great time span since their inception, the technology has evolved with numerous designs and advancements predominantly geared toward addressing rider comfort. With the initial designs from many years ago comprising a single speed power transmission mechanism often requiring the rider to either exert undue effort on the pedals or have to alternate the pedals at an uncomfortably high rate to achieve desired riding speed, a need was recognized for multiple powertrain ratios to facilitate acceptable operator pedaling rates and efforts. A variety of designs consequently evolved where additional power transmission sprockets of various number of teeth but equal pitch were added in the axial directions of the pedals mechanism as well as power transmission rear wheel to facilitate a combination of front and rear power transmission ratios resulting in optimal settings based on desired vehicle speeds, road conditions, operator biometrics and preference. This innovation was facilitated by the de-facto standard four bar linkage mechanism based derailleur assembly used to this very day to alternate drive sprockets through properly positioning the drive chain thereto as well as compensate for resultant varying chain lengths through an integral spring loaded chain tensioning mechanism. The capability was facilitated by two cable tensioning apparatuses, one for rear sprockets and another for the fronts. With one end of each cable apparatus connected to the derailleur chain positioning mechanism and the other end to an operator actuation mechanism typically comprising a lever assembly, this apparatus granted the operator the ability to alternate the chain position in the axial position for proper alignment and thereby engagement of selected rear and front drive sprockets in order to achieve optimal power transmission ratio settings. Advancements in the actuation mechanism included indexing capability of the operator lever assembly so that the actuation of the gearing mechanism takes place in an indexing fashion consistently properly aligning the chain with desired sprocket thereof rather than one continuous motion requiring the operator to guess the proper chain position often leading to positioning errors.

As the technology to provide the desired function of automating the manual shift operation of the bicycle has existed for years, numerous attempts have been made to provide a robust yet commercially successful product. Some were attempts sacrificing robust componentry for cost, tight packaging and commerciality, in the process adding extraneous components such as springs and levers to prevent premature failure, while others were based on complex mathematical or fixed criteria based on "one for all" approaches. All ultimately achieving varying levels of success but uniformly falling short of meeting widespread commercial acceptance. On the fundamental level, most of these offerings had in common the failure to recognize that acceptance of these various designs ultimately boiled down to adaptability by a user population widespread in biometrics, endurance, strength and size.

The inventor hereby discloses a versatile automatic bicycle shifter making use servo motors, a robust microprocessor based control system making use of various speed, controls and road inclination sensors, and a highly adaptable user interface which, through a set of operator predefined and in real time adjustable criteria, is used to place the powered shifter mechanism in an optimal position on a consistent basis in order to provide a more pleasurable and comfortable experience for the rider thereby consistently achieving acceptable pedaling rates and efforts based on the ever changing need of the rider.

DISCUSSION OF PRIOR ART

The following is a brief summary of prior art deemed pertinent to the automatic bicycle shifter and user interface of the present invention.

U.S. Pat. No. 9,234,580 discloses a control device for a bicycle automatic transmission comprising an entailed computation algorithm based traveling resistance computed with readings of torque measurements, cadence or pedaling rate, bicycle speed and mass of bicycle and rider. As this approach is fundamentally based on assuming that two riders with the same weight but with significantly different muscles to fat ratios have synonymous abilities, the end result that this approach is likely to yield seems to be less than optimal. This disclosure, additionally falls short of providing a bicycle shifting criteria highly adaptable by the rider devoid of any complex mathematical calculations destined to fall short of providing riders an adequate result.

U.S. Pat. No. 8,977,450 identifies a bicycle derailleur shifting apparatus making use of a pedal crank angle sensor to calculate optimal shift timing. This disclosure is based on the assumption that a great effort is needed post the actual sprocket shift taking place such as in premature shifting requiring the rider to exert undue effort while in fact a properly timed automatic shifter will conduct this action when the bicycle speed has reached a threshold defined by the rider, where the post shift pedaling effort is acceptable. With the outlined sifting action solely based on a pedals crank angle sensor, disclosure does not seem to define a cooperating and functional system. Being very limited in nature, outlined approach would be best applied to an existing comprehensive bicycle automatic gear shifting apparatus.

U.S. Pat. No. 8,900,087 outlines a disclosure for an automatic bicycle shifting apparatus based on a mechanical governor where centrifugal force due to wheel speed results in a planetary gear change. Although this disclosure could very well result in an operable system, shift settings are solely a function of bicycle speed thereby ignoring rider biometrics, road conditions and personal preferences at the time the actual riding is taking place in the process likely falling short of preference and capability of the rider.

U.S. Pat. No. 8,512,182 details an intricate mechanical automatic bicycle shifting apparatus based on mechanical torque measurements with operator strength selectable criteria. As is the case with most mechanical devices shift action is mostly preset depriving the rider from making changes in real time without stopping. The sheer complexity of the outlined design comprising levers springs, weights, etc. . . . is likely to prove less reliable as well as less user friendly than other simpler design making use of electronics to produce desired optimal result for the rider.

U.S. Pat. No. 7,892,122 B2 and Reissue Patent U.S. RE41,782 summarize a complex derailleur arrangement making use of torsion spring to permit shifting less bicycle chain motion. In reality, this provision is intended to overcome the great constraint placed on this design by confining the derailleur motor along with reduction gearing to a small housing. As a shift operation less any chain movement sensors confirming shift action is possible, is likely to prove detrimental to this confined and prone to overheating motor, attempt have been made for the derailleur to reach intended position during shift notwithstanding lack of chain motion so that applied power would cease short of burning the small motor windings thereof. In is noteworthy though, to indicate that this problem does not resolve the shortcoming of the legacy derailleur of not being able to shift less chain motion, this approach simply attempt to overcome the aforementioned challenge inherent to the legacy shifter design. An LCD screen is offered along with manual shift up and down switches as well as with another switch to alternate between manual and automatic shift operation. Without taking into account road conditions and operator preference and granting the rider ability to make changes on the fly without stopping, this disclosure, although a substantial improvement of preceding art, still falls short of providing the rider with an acceptable system with ability to instantaneously achieve desired optimal riding settings with ease.

U.S. Pat. No. 7,247,108 defines a microprocessor based automatic bicycle derailleur shifting method based on a simplistic logical algorithm for derivation of an adequate combination between front and rear sprockets determined by the inventor to be an adequate approach. Along with prior reasoning, a device that applies across a spectrum spanning from a $50^{th}$ percentile female and a 90th percentile male without offering the rider meaningful means to adjust to own riding preference, is essentially guaranteed to produce the unwanted result where the rider has to pedal too fast with too little effort or instead, too slow with too much effort. It is also noteworthy that the inventors of this device did recognize the need to include an otherwise nonexistent user interface into their design. An LCD screen is offered for the rider with manual shift up and down switches along with another switch to alternate between manual and automatic shift operation. Therefore, it is evident that the inventor recognized that the rider would need to get around the automatically computed shift selection of this approach, at least some of the time.

U.S. Pat. No. 6,997,835 B2 discloses a bicycle electrically powered rear derailleur with compliance means for storage of energy so that actuation thereof takes place as needed notwithstanding lack of necessary forward chain motion required by the legacy four bar linkage shifter design. As such an approach alleviates potential motor overheating conditions due to lack of necessary forward chain motion necessary for the derailleur to reach intended position, the seek position of the shift motor is nevertheless achieved with compliance means storing the shifting energy. Important to note that this does not solve the problem of the device being in the wrong setting after stopping, the sole advantage of this invention is relieving the derailleur motor of excess work and thereby minimizing any chances of overheating. It is also worthwhile to note that this additionally places an undesirable side load on the drive chain. Moreover, lack of highly desirable accuracy of the position held by the derailleur since reaction by a mechanical spring is typically proportionate to displacement so that the derailleur final settling position, although typically close, is nevertheless never reached due spring hysteresis and offset by the encountered resistance by the chain and mechanical friction within the derailleur linkage.

U.S. Pat. No. 5,480,356 discloses an electrically powered derailleur where the legacy spring has been replaced with a highly special linear actuator making use of a planetary gearset. It is clear based on the geometry of this invention as outlined in respective art that a major component of the force of the linear actuator is going into thrust in one of the joints while the force component serving to produce the actual shifting action is miniscule. Aside from realizing highly detrimental forces to joint bearings, this approach in turn requires greatly oversizing the actuator to realize an acceptable force output leading to a very costly linear actuator highly prone to failure.

Notwithstanding the long sought after successful design for alleviating the bicycle rider from the demanding task of continually seeking an acceptable shift setting, an effective and highly adaptable by the rider solution to this challenging problem, as can be seen from outlined art, has proven highly elusive. Lack of disclosed art along with lack of commercially successful and thereby available products facilitating automatic and highly adaptable shifting criteria for the rider is further evidence to the absence of a bicycle automatic shifter, controls and user interface means with these highly desirable characteristics.

BRIEF SUMMARY OF THE INVENTION

Inventor discloses means for achieving the highly desirable option of relieving the bicycle rider of the drivetrain shifting task through equipping the bicycle shifter mechanism with a servo power actuation device governed by a microprocessor based electronic control system comprising bicycle speed and road condition sensors to proactively manage in real time engagement of suitable front and rear drive sprockets based on operator preset criteria resulting in an optimal and automatically selected drive operation ratio in order to facilitate acceptable pedaling rates and efforts.

The preferred embodiment of the automatic bicycle shifter of the present invention comprises a novel actuation mechanism powered by a servo electric motor coupled to a high gearing ratio reducer making use of worm and spur or helical teeth gearing with output shaft thereof directly affixed to one of the actuation links of the chain positioning four bar linkage serving to accurately position the drive chain guiding idler sprockets cage assembly and consequently positioning of slaved bicycle drive chain in precise predefined positions of alignment with specific drive sprockets, and slaving said actuation mechanism thereof to a comprehensive microprocessor based controls system comprising a bicycle speed sensor, an inclinometer, a chain movement sensor, and motor power amplifiers serving to drive said actuation servo motor under microprocessor command thereby facilitating automatic bicycle drive powertrain shifting for the operator based on preset and continually available setting criteria presented to the rider through a user friendly interface.

Inventor also discloses an alternate embodiment of the automatic bicycle shifter of the present invention making use of alternate derailleur assembly powered by a remote servo controlled gearmotor serving to provide actuation means for derailleur assembly through of a sheathed cable.

As rider comfort is a continually moving target based on the rider condition often governed by traveled distance, conditioning, road and weather conditions, predefined and fixed shift criteria become simply unacceptable. Consequently, a user interface facilitating means to continually adjust the bicycle shifting criteria with ease is offered in order to successfully realize the intended function of the invention. Emphasis is thereby placed on tailoring the user interface to rider condition in real time by providing slide touch controls realizing ability to proportionately or in a user predefined relationship adjust shifting thresholds up or down. As road inclination comes into play as well, another sliding touch control is provided for user to adjust programmed shifting thresholds attenuation due to road inclination in real time. Ability to switch to manual is yet another option that the user might result to under certain circumstances so this functionality is also offered by the novel user interface of this invention.

Additional benefits of the user interface of the present invention include presenting the operator through a microprocessor controlled display, shifter settings, cumulative mileage on the bicycle, bicycle speed, trip distance all in English or International Standard units, a stop watch with start, stop and split functions and time and date information.

BRIEF DESCRIPTION OF THE DRAWINGS

FIG. 9A is a perspective view of the rear derailleur of the preferred embodiment of the automatic bicycle shifter and user interface of the present invention.

FIG. 9B is an oblique perspective view of the rear derailleur of the preferred embodiment of the automatic bicycle shifter and user interface of the present invention.

FIG. 9C is a bottom perspective view of the rear derailleur of the preferred embodiment of the automatic bicycle shifter and user interface of the present invention.

FIG. 10A is an oblique exploded view of the rear derailleur of the preferred embodiment of the automatic bicycle shifter and user interface of the present invention.

FIG. 10B is an exploded view of the rear derailleur of the preferred embodiment of the automatic bicycle shifter and user interface of the present invention taken from the opposite direction to FIG. 10A.

FIG. 12A is an oblique perspective view of the rear derailleur of the preferred embodiment of the automatic bicycle shifter and user interface of the present invention in extreme extended position.

FIG. 12B is an oblique perspective view of the rear derailleur of the preferred embodiment of the automatic bicycle shifter and user interface of the present invention in extreme retracted position.

FIG. 14A is a top perspective view of the front derailleur of the preferred embodiment of the automatic bicycle shifter and user interface of the present invention.

FIG. 14B is a perspective view of the front derailleur of the preferred embodiment of the automatic bicycle shifter and user interface of the present invention taken from an opposite direction to FIG. 14A.

FIG. 14C is an oblique bottom perspective view of the front derailleur of the preferred embodiment of the automatic bicycle shifter and user interface of the present invention.

DETAILED DESCRIPTION OF THE INVENTION

Preferred Embodiment Construction—FIGS. 1-4

Figure 1:
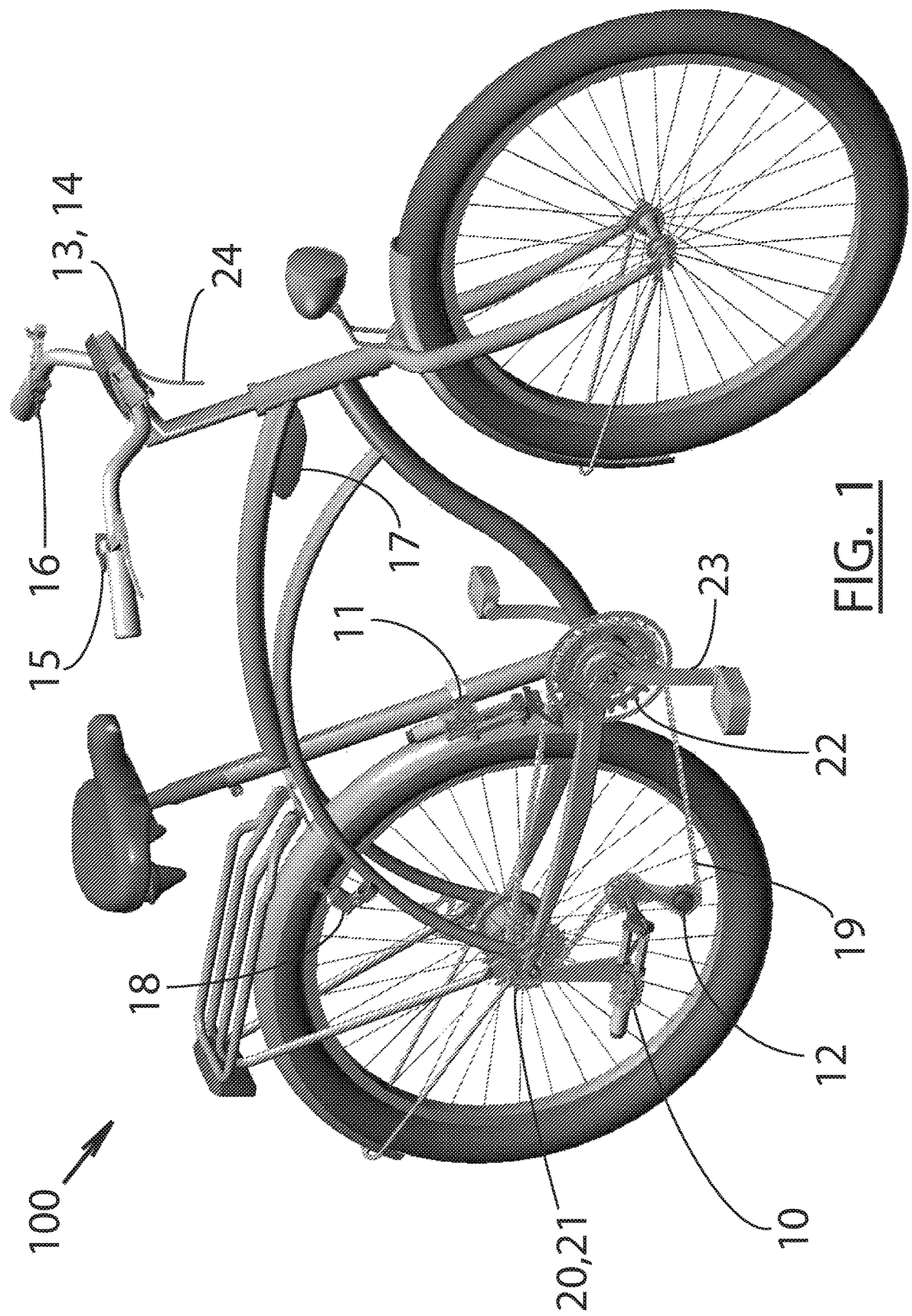
FIG. 1 is a perspective overall view of the systems and components comprising the preferred embodiment of the automatic bicycle shifter and user interface of the present invention.
Figure 2:
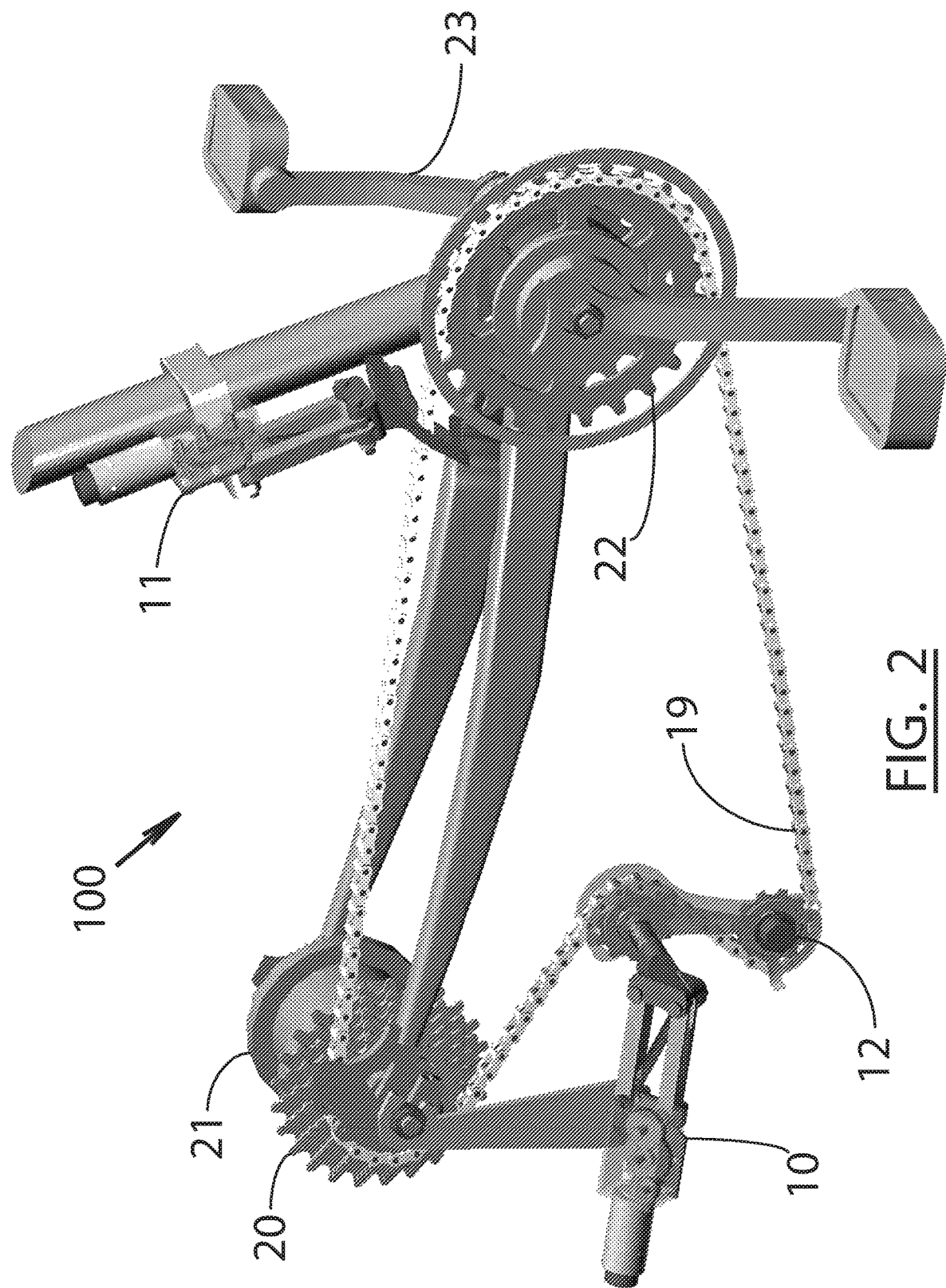
FIG. 2 is a perspective view of the powertrain of the preferred embodiment of the automatic bicycle shifter and user interface of the present invention.
Figure 3:
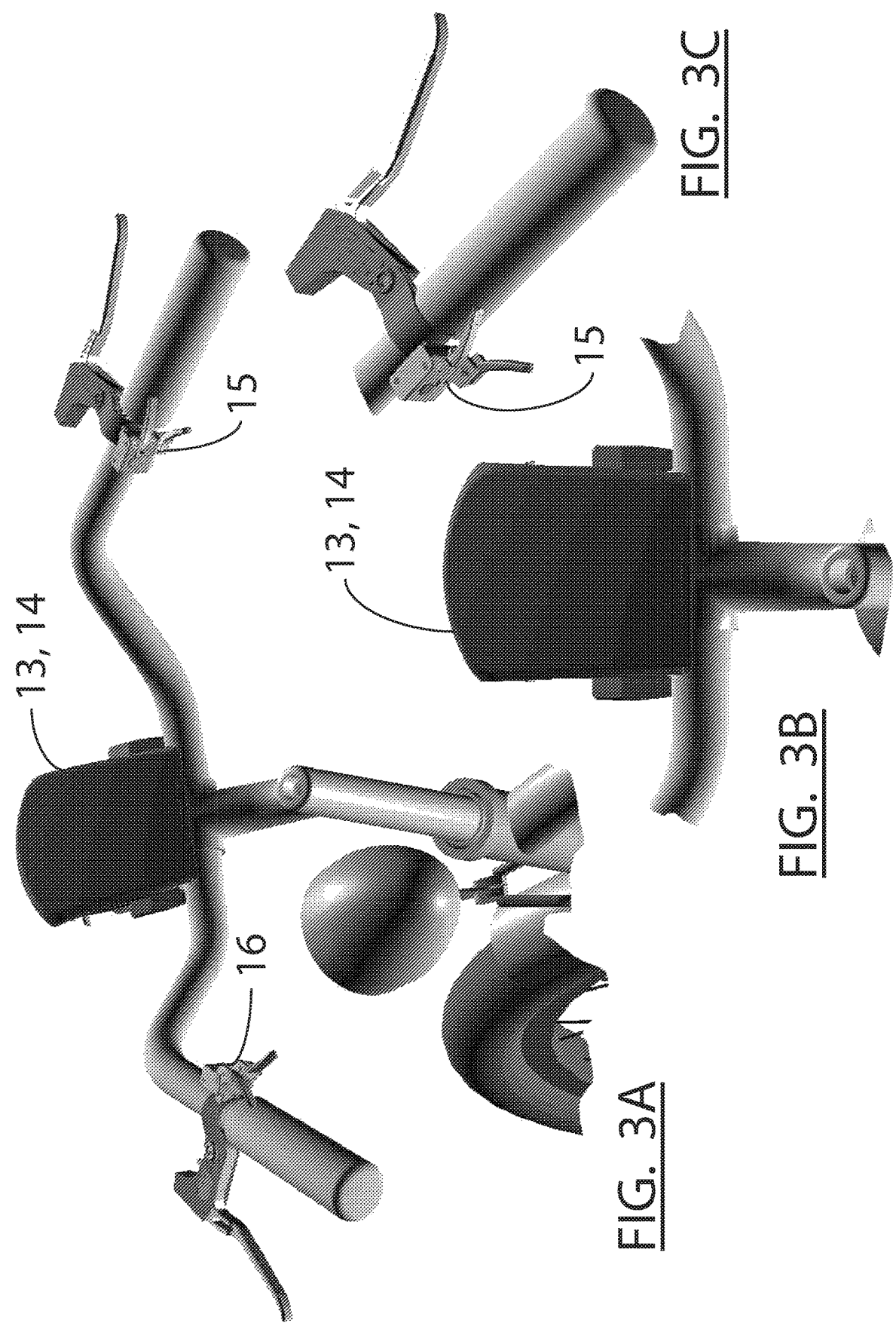
FIG. 3A is a view of the operator panel, switches and control system of the preferred and alternate embodiments of the automatic bicycle shifter and user interface of the present invention in preferred location on the bicycle handlebars.
FIG. 3B is a closeup view of the operator panel and control system of the preferred and alternate embodiments of the automatic bicycle shifter and user interface of the present invention.
FIG. 3C is a view of the manual override switches for the rear derailleur of the preferred and alternate embodiments of the automatic bicycle shifter and user interface of the present invention depicted in their preferred mounting position on the right bicycle handlebar.
Figure 4:
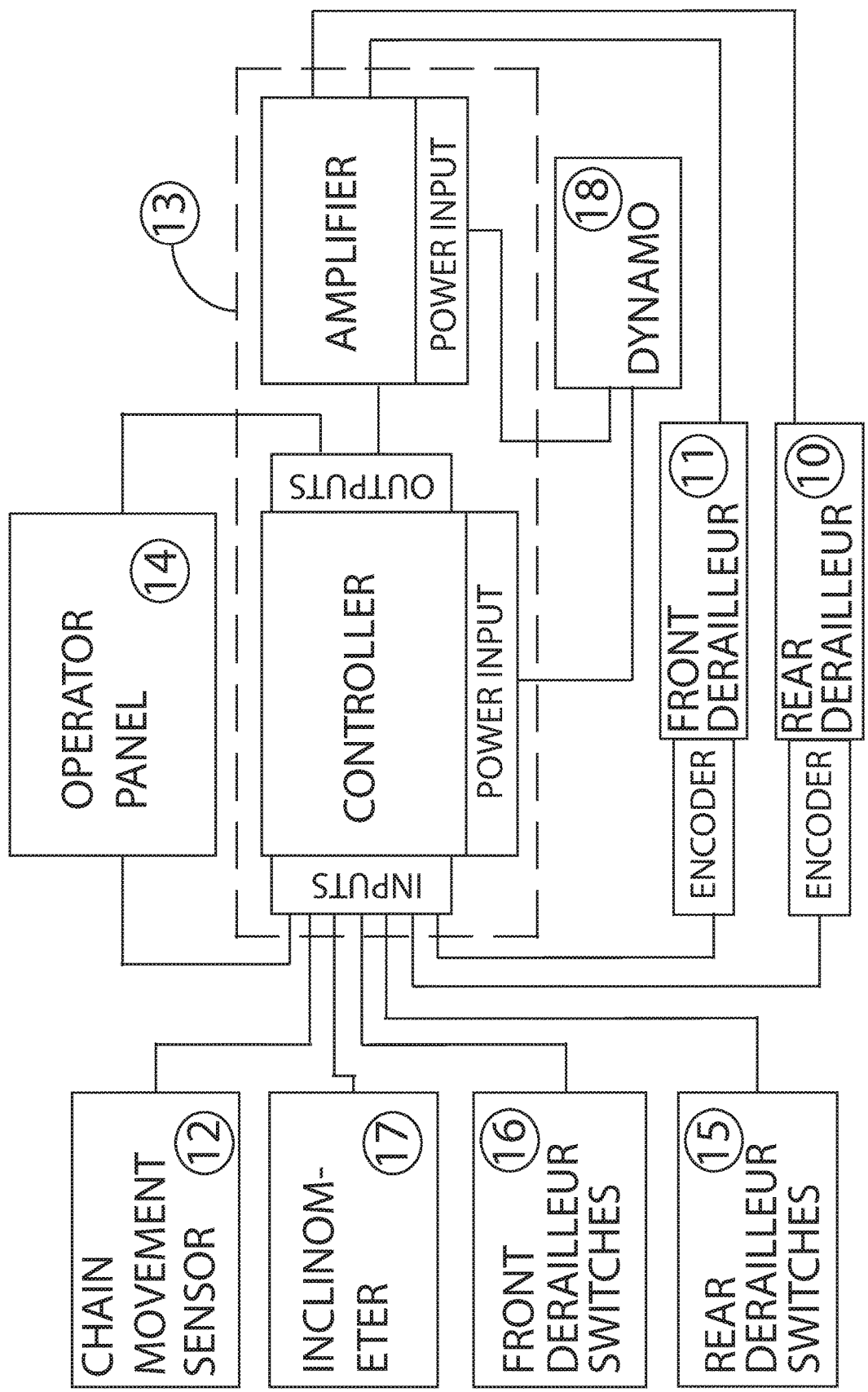
FIG. 4 is a block diagram of the control system and components of the preferred and alternate embodiments of the automatic bicycle shifter and user interface of the present invention.

With reference to FIGS. 1-4, the preferred embodiment 100 of the automatic bicycle shifter and user interface of the present invention comprises rear derailleur assembly 10 serving to alternate chain 19 between sprockets 20 of rear drive hub assembly 21, front derailleur assembly 11 serving to alternate chain 19 between front sprockets assembly 22 of front pedals assembly 23, chain movement sensor 12, control system 13, operator panel 14, rear derailleur manual shifting switches 15, front derailleur manual shifting switches 16, inclinometer 17 and dynamo 18 serving as expended power replenishment means as well as bicycle speed sensing means. Partially shown wiring harness 24 serves to interconnect control system 13 to operator panel 14, manual switches 15 and 16, inclinometer 17, front derailleur 11, dynamo 18, rear derailleur 10 and chain movement sensor 12.

Figure 5:
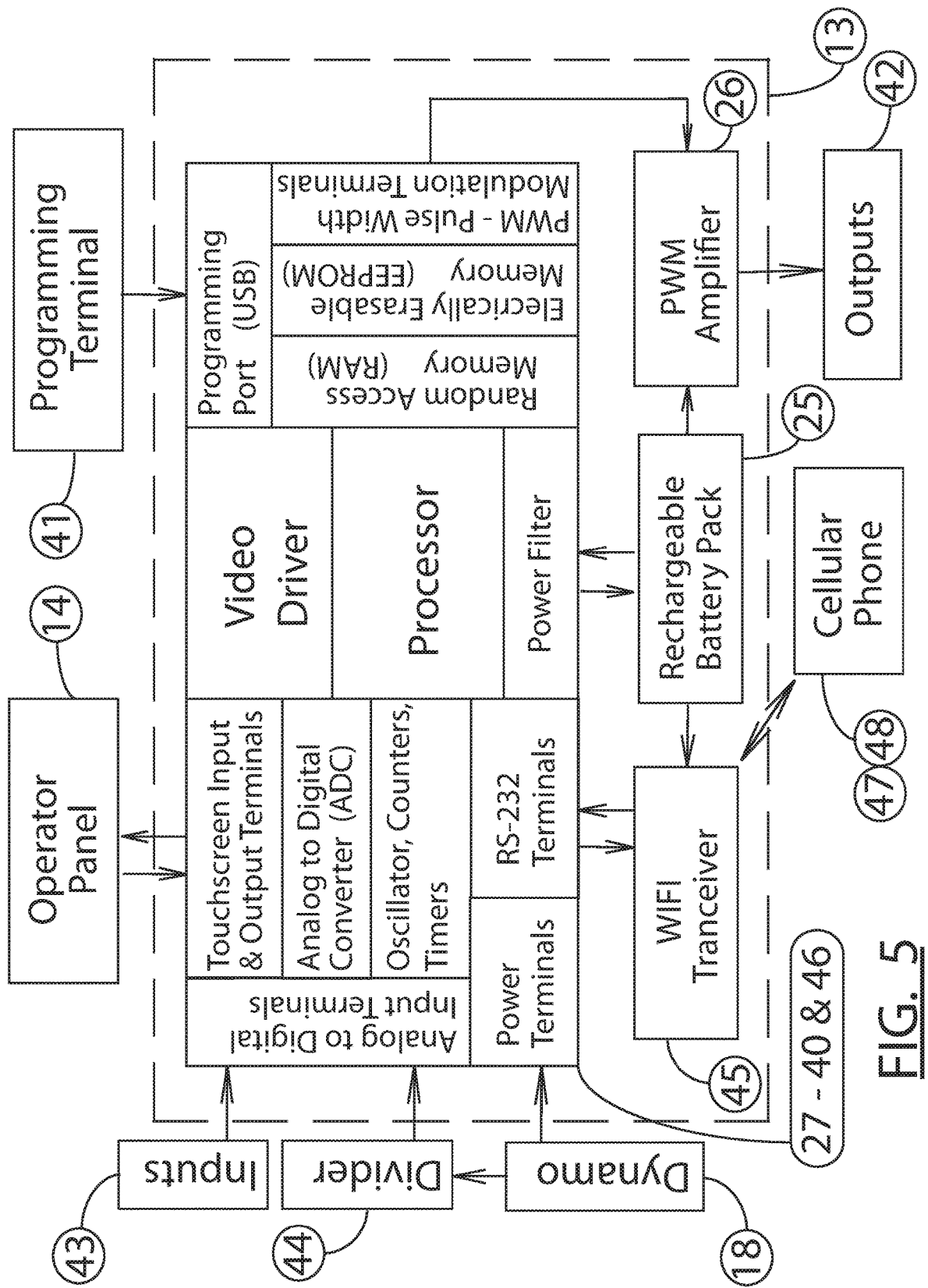
FIG. 5 is a block diagram of the controller of the preferred and alternate embodiments of the automatic bicycle shifter and user interface of the present invention.

Preferred and Alternate Embodiment Controls—FIG. 5

With reference to FIG. 5, the preferred and alternate embodiments of the automatic bicycle shifter and user interface of the present invention includes Control system 13 comprising steady power supply rechargeable battery pack 25, pulse width modulation (PWM) amplifier 26 and a controls section 27 comprising processor 28, video driver 29, random access memory (RAM) 30, oscillator/counters/timers subsection 31, analog to digital converter (ADC) subsection 32, and power filter 33, acting as an integral system serving to execute programming instructions received through universal serial (USB} programming port 34 and stored into electrically erasable programmable read only memory (EEPROM) 35 in order to control pulse width modulation (PWM) output terminals 36 in response to analog signals received through analog to digital (ADC) input terminals 37 and real time operator instructions from touchscreen display input terminals 38, display real time status through touchscreen display output terminals 39 with consumed power constantly being replenished through power terminals 40. Software updates to controls system 13 and touchscreen display 14 executed through programming terminal 41 are not limited to archiving existing user settings, downloading other users settings, installation of alternate user interfaces and patches geared to continually improve system performance of pulse width modulation (PWM) outputs 42 in response to inputs 43 of rear derailleur 10, front derailleur 11, chain movement sensor 12, rear derailleur manual shifting switches 15, front derailleur manual shifting switches 16, inclinometer 17, bicycle speed input signal received through dynamo voltage divider 44 and improved conservation of power received from power source dynamo 18. WIFI Transceiver 45 with bidirectional communication to control system 13 through RS-232 terminals 46 facilitates alternate control of the preferred and alternate embodiments of the automatic bicycle shifter and user interface of the present invention through cellular phone 47 running a custom user interface and application communication software 48.

Figure 6:
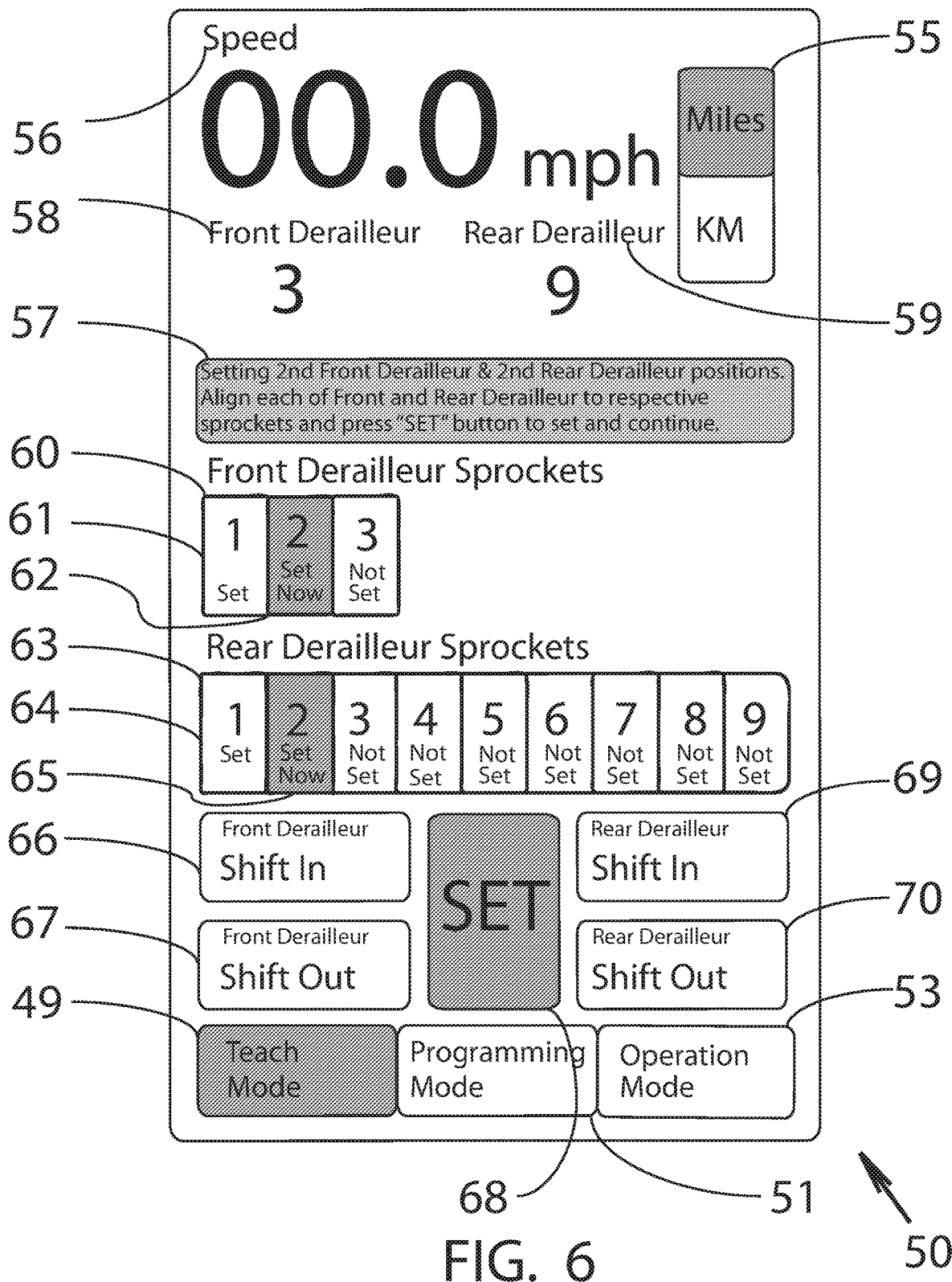
FIG. 6 is a view of the preferred operator panel "Teach Mode" user interface of the preferred and alternate embodiments of the automatic bicycle shifter and user interface of the present invention.
Figure 7:
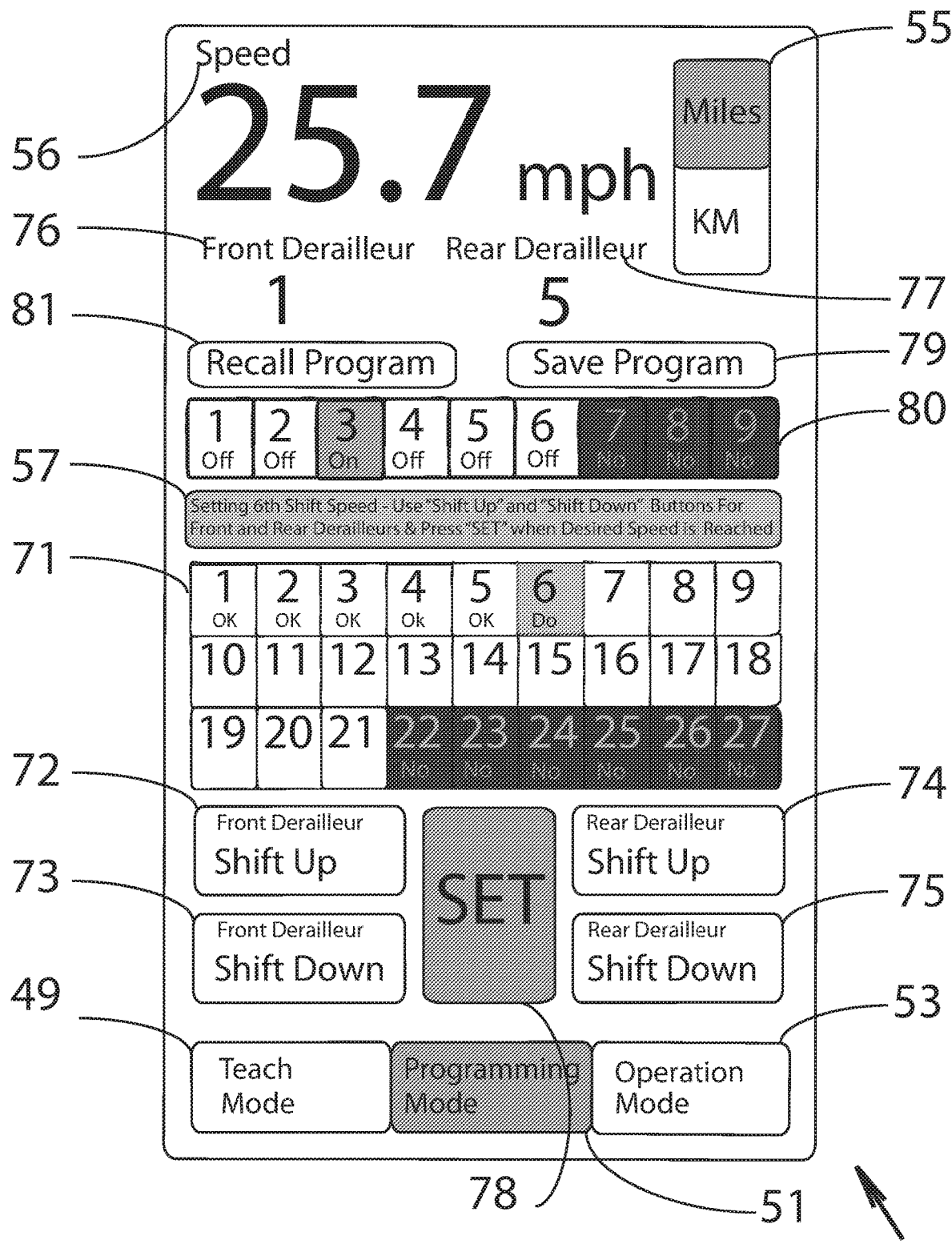
FIG. 7 is a view of the preferred operator panel "Programming Mode" user interface of the preferred and alternate embodiments of the automatic bicycle shifter and user interface of the present invention.
Figure 8:
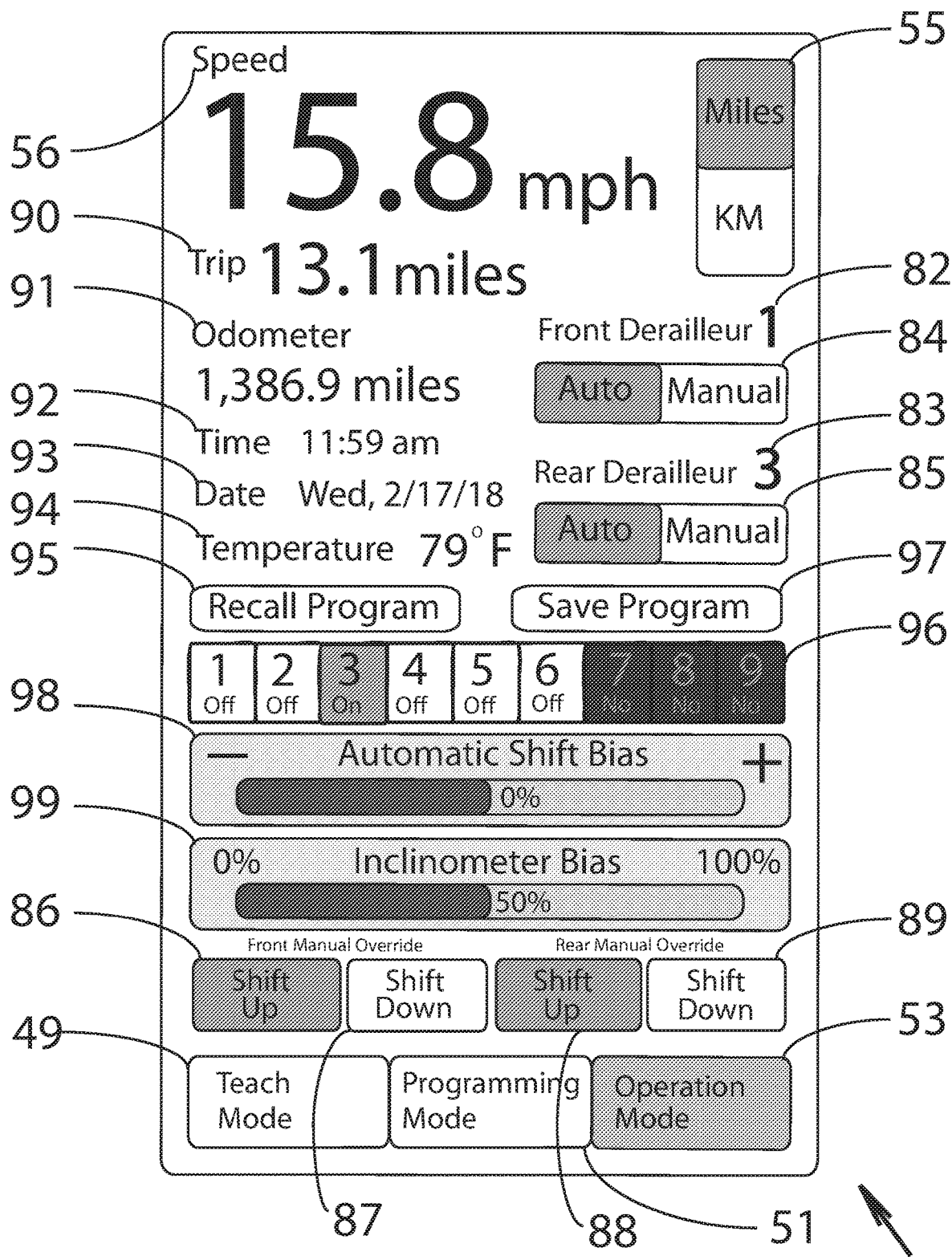
FIG. 8 is a view of the preferred operator panel "Operation Mode" user interface of the preferred and alternate embodiments of the automatic bicycle shifter and user interface of the present invention.

Preferred and Alternate Embodiment User Interface—FIGS. 6-8

With reference to FIGS. 6-8, touchscreen operator panel display 14 of the preferred and alternate embodiments of the automatic bicycle shifter and user interface of the present invention includes "Teach Mode" selection button 49 used to enter into "Teach Mode" operator screen 50, "Programming Mode" selection button 51 used to enter into "Programming Mode" operator screen 52 and "Operation Mode" selection button 53 used to enter into "Operation Mode" operator screen 54.

With reference to FIG. 6, touchscreen display 14 of the preferred and alternate embodiments of the automatic bicycle shifter and user interface of the present invention in "Teach Mode" operator screen 50 entered into by depressing button 49 after removal of bicycle drive chain for maximum visibility allows the user to define number of front derailleur shift positions, rear derailleur shift positions, align defined front derailleur shift positions to respective front sprockets and align defined rear derailleur shift positions to respective rear sprockets. "Teach Mode" screen operator screen includes speed selection button 55 enabling user to select speed and distance units in Miles or kilometers (KM), bicycle speed display 56, user prompt window 57 used in "Teach Mode" screen 54 to walk user through setup initially prompting user for number of front derailleur sprockets entered through window 58 initially displaying a value of "1" and incrementing with each user tap to window 58 until the correct number of front derailleur sprockets is displayed followed by user tapping window 57 for entry thereof, number of rear derailleur sprockets entered through window 59 also initially displaying a value of "1" and incrementing with each user tap to window 59 until the correct number of rear derailleur sprockets is displayed followed by user tapping window 57 for entry, with window 57 subsequently walking user through setting of front derailleur sprockets alignment positions as depicted in window 60 reflecting number of front derailleur sprocket positions defined through window 58, with defined front sprockets alignment positions 61 depicting text "Set" and with front sprocket alignment position being defined 62 in gray highlight background and depicting text "Set Now" and front derailleur sprocket alignment positions yet to be set depicting text "Not Set", and rear derailleur sprockets alignment positions depicted in window 63 also reflecting number of rear derailleur sprocket positions defined through window 59, with defined rear derailer sprockets alignment positions 64 depicting text "Set" and rear derailleur sprocket alignment position being defined 65 in gray highlight background and depicting text "Set Now" and rear derailleur sprocket alignment positions yet to be defined depicting text "Not Set", front derailleur "Shift In" button 66 and front derailleur "Shift Out" button 67 used to inch front derailleur into accurate alignment with respective sprocket for front derailleur position being defined in window 62 prior to user depressing "SET" button 68 to set, rear derailleur "Shift In" button 69 and rear derailleur "Shift Out" button 70 used to inch rear derailleur into alignment with respective sprocket for rear derailleur position being defined in window 65 prior to depressing "SET" button 68 to set. Once a front or rear sprocket position is set, user prompt window 57, front derailleur sprocket position window 62, rear derailleur sprocket position window 65, front derailleur status window 60 and rear derailer status window 63 all update to guide user through setting of following front and rear derailer sequential sprocket position with process continuing until all sprocket positions depicted in front derailleur sprockets position window 60 and all rear derailer sprockets position depicted in window 63 are defined. Once all front and rear derailleur sprocket positions are defined prompt window 57 instructs user to replace the bicycle drive chain and depress button 51 to enter into programming mode.

With reference to FIG. 7, touchscreen display 14 of the preferred and alternate embodiments of the automatic bicycle shifter and user interface of the present invention in "Programming Mode" operator screen 52 entered into by depressing button 51 comprises bicycle miles or kilometers (KM) units selection button 55, bicycle speed display window 56, aforementioned user prompt window 57 serving in "Programming Mode" to walk the user through derailleur programming initially prompting the user to define the number of desired "Shift Speeds" entered by depressing desired number displayed in window 71 encompassing all possible shifter combinations based on user input of number of front derailleur and rear derailleur sprocket positions previously defined in "Teach Mode" and initially all displayed in an disabled black background and carrying text "No" with user input subsequently causing all desired "shift speeds" backgrounds to turn to white denoting availability for programming. User prompt window 57 subsequently prompts the user to set all "shift speeds" sequentially starting with "shift speed" "1" in turn denoted in window 71 by text "Do" and is highlighted with a gray background which the user then programs by defining a certain shift combination while riding and depressing manual front derailleur "Shift Up" button 72, front derailleur "Shift Down" button 73, rear derailleur "Shift Up" button 74 and rear derailleur "Shift Down" button 75 with window 76 prompting user with front derailleur sprocket position being set and window 77 prompting user with rear derailleur sprocket position being set. Once selection of "shift speed" and respective front and rear derailleur selections are made, user accelerates or decelerates until desired shift speed thresholds as displayed in speed display 56 is reached and then depresses programming speed "SET" button 78 to set which then results in denoted text for respective programming "shift speed" in window 71 to switch from "Do" to "Ok" with window 71 subsequently indexing to following sequential position which is then denoted by text "Do" for programming, with the process repeating sequentially until all defined "shift speeds" in window 71 are set. User depresses "Save Program" button 79 to save programmed shift positions in window 71 at any time by subsequently depressing any of available programming button positions in window 80 initially all depicted in a disabled black background and denoted by text "No" and which upon saving turn to white are depicted with text "On" and with already programmed program buttons denoted by text "Off". Program saving feature thereby enables user to save different riding profiles, such as for casual riding, speed riding, racing, etc. . . . or with additional simplified profiles making use of only the front or the rear derailleur. "Recall Program" button 81 followed by program selection from window 80 is used to recall any saved programs for modification or reprogramming by subsequently depressing any of "shift speeds" in window 71 for redefinition using the same procedure employed in initial programming. For maximum flexibility, no restriction is placed on the number of shift combinations, repetition of shift positions or the number of programmed shift positions from displayed selection in window 71 prior to the user being able to enter into operation screen 54.

With reference to FIG. 8, touchscreen display 14 of the preferred and alternate embodiments of the automatic bicycle shifter and user interface of the present invention in "Operation Mode" operator screen 54 entered into by depressing button 53 comprises bicycle miles or kilometers (KM) units selection button 55, bicycle speed display 56, front derailleur position display 82, rear derailleur position display 83, command button to place front derailleur in automatic or manual mode 84, command button to place rear derailleur in automatic or manual mode 85, front derailleur manual and override shift up button 86, front derailleur manual and override shift down button 87, rear derailleur manual and override shift up button 88, rear derailleur manual and override shift down button 89, accumulated trip mileage 90, odometer 91, time 92, date 93, temperature display 94 which defaults to degrees "Fahrenheit" units if miles units are selected through button 55 or degrees "Celsius" units if KM units are selected, recall program button 95 used to reactivate programs saved through window 80 in "Programming Mode" screen 52 and depicted in window 96 with a white background and are denoted with an "Off" designation and which upon activation take on a gray background and are then denoted with an "On" designation while selection buttons not programmed in "Programming Mode" screen 52 are displayed in a disabled black background and displayed with a "No" designation, save program button 97 used to save any modification to recalled program selection assigned a gray background and denoted by an "on" designation in window 96, "Automatic Shift Bias" touch control slide bar 98 serving to permit user to scale up or down programmed speed shifting thresholds of programmed speed positions in aforementioned programming position window 71 of "Programming Mode" screen 52 for active program selection in window 96 denoted with "On" designation based on own preference in real time, and "Inclinometer Bias" road inclination touch control slide bar 99 serving to proportionately scale up of down automatically configured attenuation to programmed shifting speed thresholds in aforementioned programming position window 71 of "Programming Mode" screen 52 for active program selection in window 96 denoted with "On" designation, in order to achieve acceptable pedaling effort levels based on road inclination and conditions in real time.

User Interface Options—FIGS. 6-8.

With Reference to FIGS. 6-8, the preferred embodiment of the user interface of preferred and alternate embodiments of the automatic bicycle shifter and user interface of the present invention is fitted for operation with a front and a rear derailleur, as modern bicycles are typically equipped. In the event that only either a front or the rear derailleur is connected to the system, user interfaces for "Teach Mode" 50, "Programming Mode" 52 and "Operation Mode" 54 automatically update to reflect controls for only defined derailleur with non pertinent control buttons defaulting in depiction to disabled black background and are additionally denoted by text "No". Under this simplified setup the number of "shift speeds" for the bicycle becomes simply equal to number of sprockets for the defined derailleur.

Preferred Embodiment Rear Derailleur—FIGS. 9A-9C, 10A, 10B, 11A, 11B, 12A & 12B

Figure 11A:
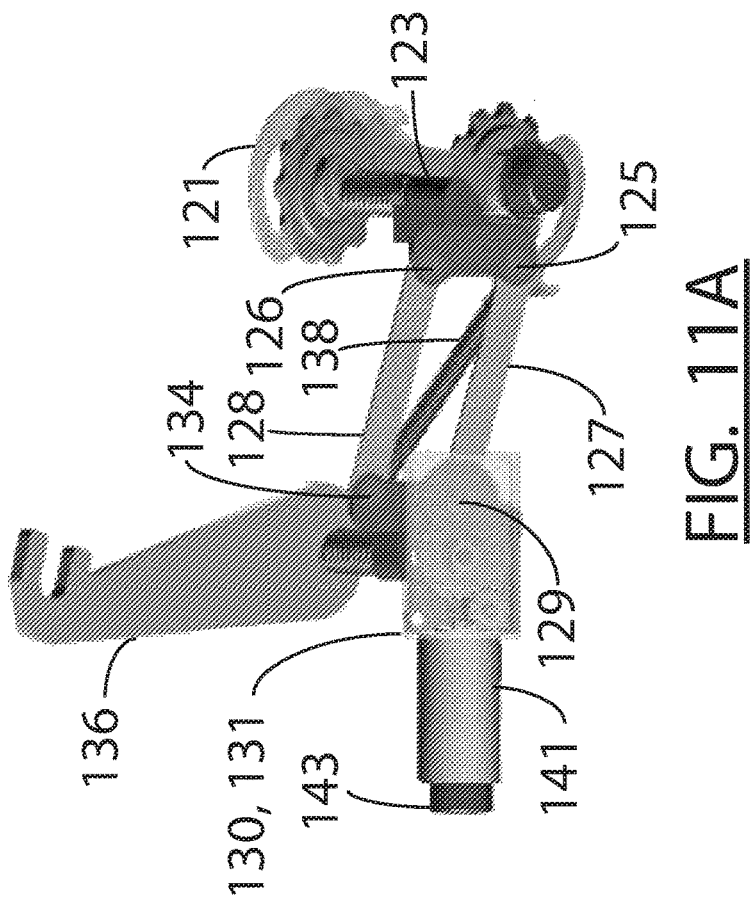
FIG. 11A is top view of the rear derailleur of the preferred embodiment of the automatic bicycle shifter and user interface of the present invention in extreme extended position.
Figure 11B:
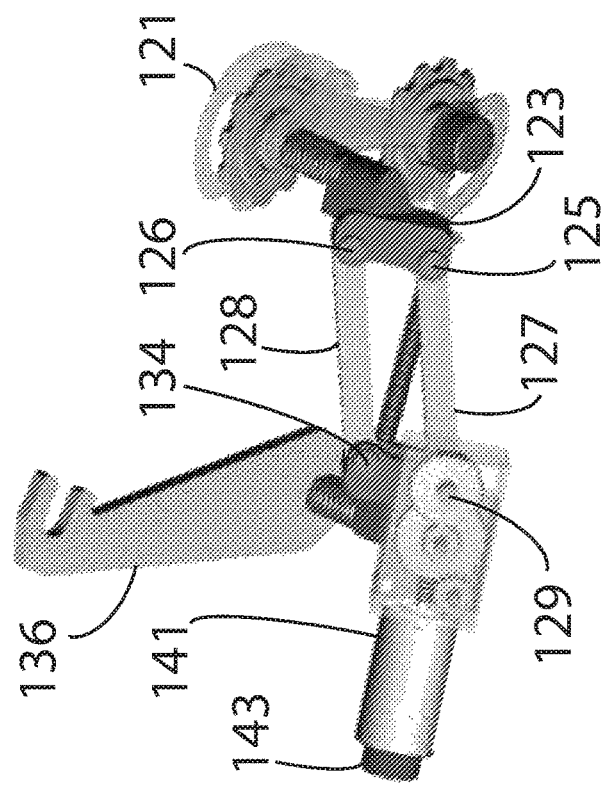
FIG. 11B is a top view of the rear derailleur of the preferred embodiment of the automatic bicycle shifter and user interface of the present invention in extreme retracted position.

With Reference to FIGS. 9A-9C, 10A, 10B, 11A, 11B, 12A & 12B, rear bicycle derailleur assembly 10 of the preferred embodiment of automatic bicycle shifter and user interface of the present invention comprises chain guiding assembly 121 affixed to axle 122 pivotally operable about bicycle linkage output yoke 123 and energized in the clockwise direction (FIG. 9A—CW) by torsion spring 124 with ends retained thereto and to derailleur linkage output yoke 123 energized in the lateral direction by thereto pivotally operable axles 125 and 126 affixed to links 127 and 128 respectfully with opposite end of link 127 affixed to shaft 129 of gearmotor 130 with housing 131 affixed to derailleur linkage input yoke 132 using screws 133 and opposite end of link 128 affixed to axle 134 pivotally operable in derailleur linkage input yoke 132 pivotally operable about axle 135 affixed to bicycle rear framework mounting bracket 136 and energized in the clockwise direction (FIG. 9A—CW) by means of thereto attached torsion spring 137 with opposite end thereof affixed to mounting bracket 136. Extension spring 138 with hook ends longitudinally retained and thereby serving to draw axles 125 and 134 closer together serves to bias position of chain guiding assembly 121 to end position extremities thereby serving as take up means for accumulative backlash in gearing of servo gearmotor 130. Chain guiding assembly 121 serves to laterally position drive chain 19 through constant engagement with captive idler sprockets 139 and 140 with sprocket 140 rotatably affixed to chain movement sensor 12 thereby serving to sense chain motion thereof. Exploded views FIGS. 10A & 10B serve to further illustrate construction of various components of rear derailleur 10 with FIGS. 11A & 11B depicting rear derailleur 10 actuation in extreme lateral positions from a top perspective, and FIGS. 12A & 12B from an oblique perspective.

Figures 13A, 13B:
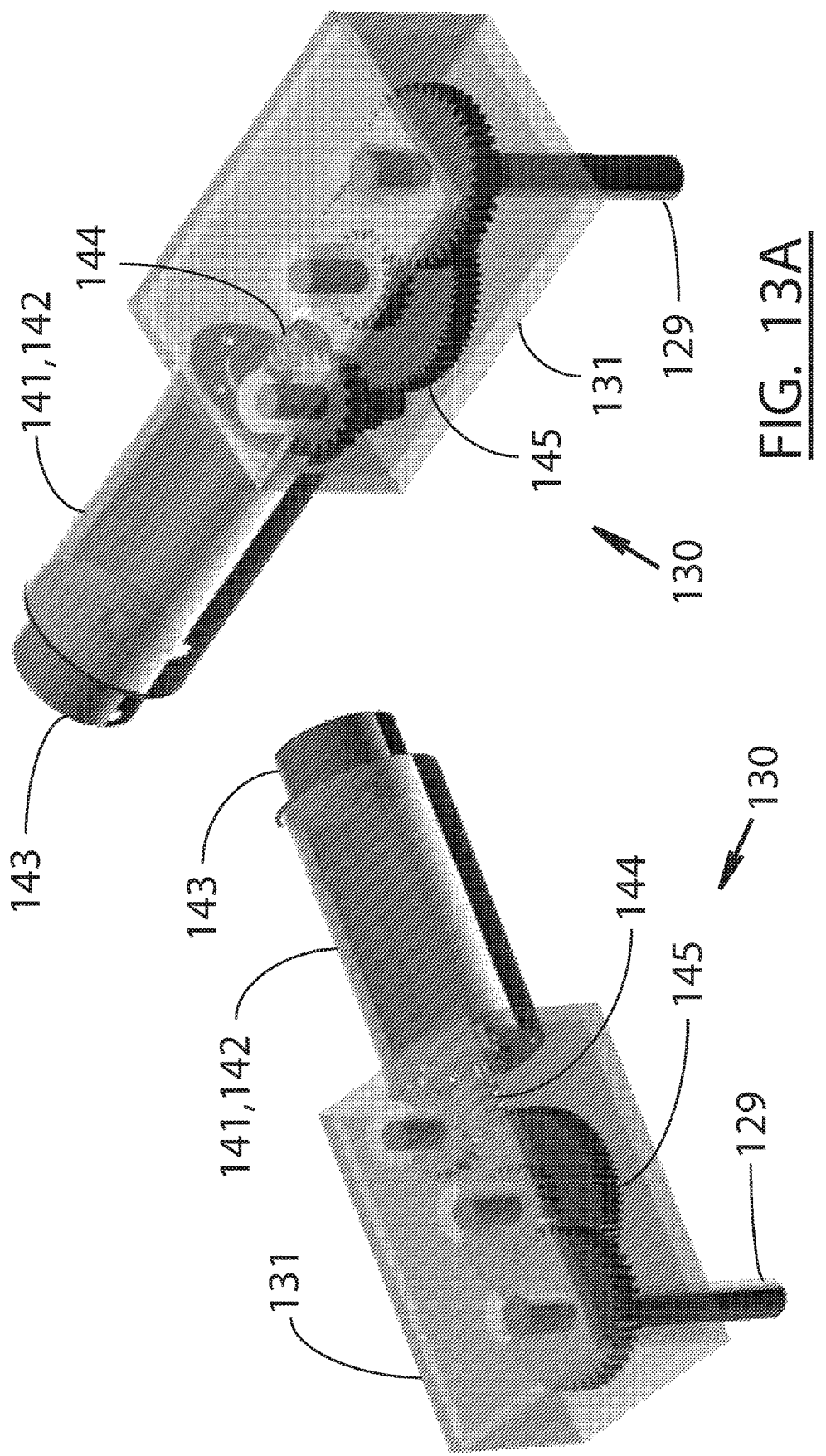
FIG. 13A is a perspective view of the servo gearmotor employed in the front and rear derailleur of the preferred embodiment of the automatic bicycle shifter and user interface of the present invention.
FIG. 13B is an oblique perspective view of the servo gearmotor employed in the front and rear derailleur of the preferred embodiment of the automatic bicycle shifter and user interface of the present invention taken from an opposite direction to FIG. 13A.
Figure 15:
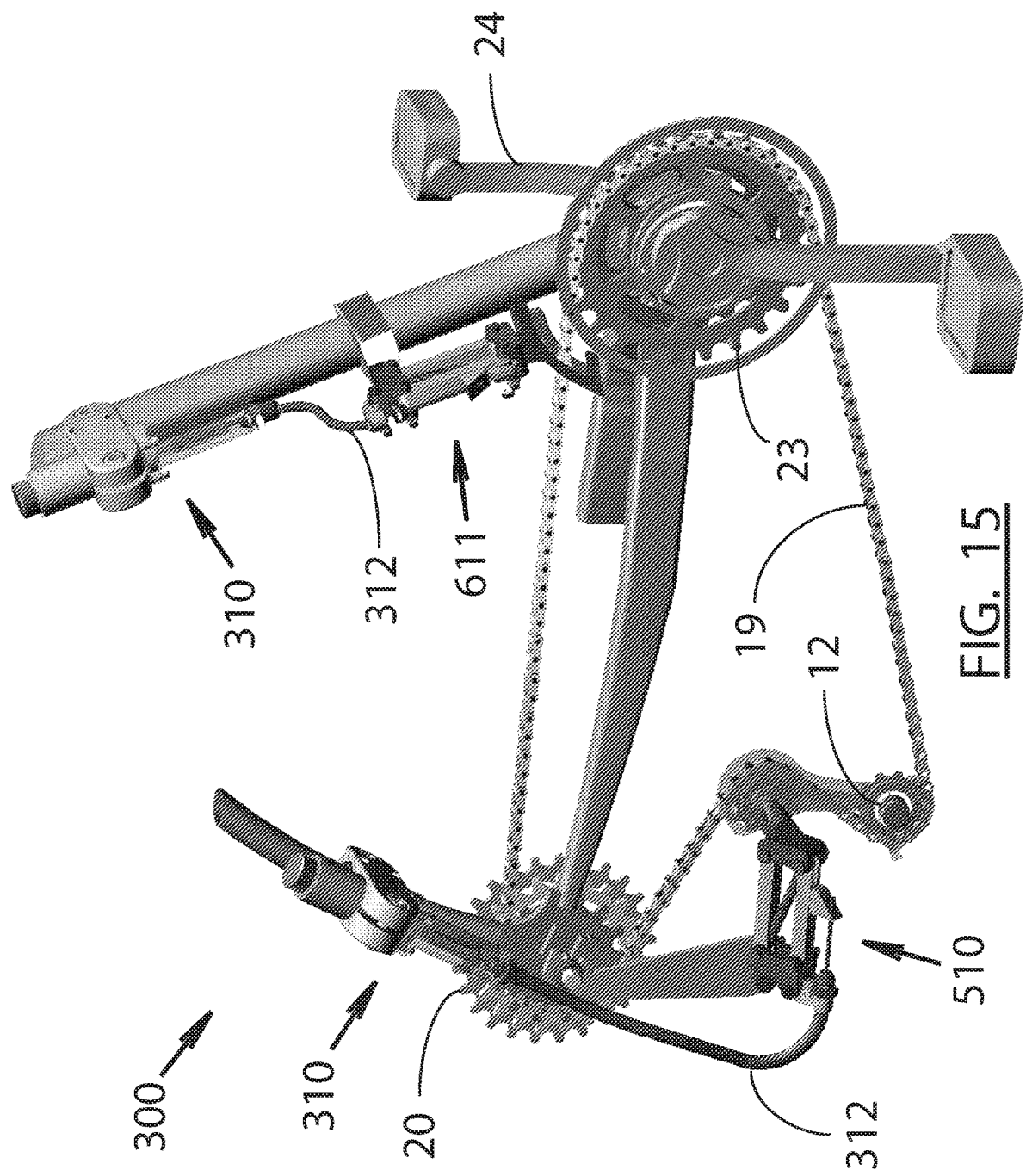
FIG. 15 is a perspective view of the powertrain of the alternate embodiment of the automatic bicycle shifter and user interface of the present invention.

Preferred Embodiment Actuator—FIGS. 13A & 13B

With Reference to FIGS. 13A & 13B, servo gearmotor 130 of the preferred embodiment 100 of the automatic bicycle shifter and user interface of the present invention includes motor 141 with body permanently affixed to gearmotor housing 131 and with armature shaft 142 rotatably affixed at the rear to encoder 143 and with opposite end thereof penetrating a slip fit connection in gearmotor housing 131 and through a rotatably secure connection to worm gear 144, serves to drive output shaft 129 through high ratio reduction gearset arrangement 145.

Preferred Embodiment Front Derailleur FIGS. 14A-14C

With Reference to FIGS. 14A-14C, front bicycle derailleur assembly 11 of the preferred embodiment 100 of the automatic bicycle shifter and user interface of the present invention comprises chain guiding assembly 221 affixed to bicycle linkage output yoke 223 and serving to align chain 19 with selected sprocket of front sprocket assembly 22 (not shown in Figs.) through action of output yoke 223 energized in the lateral direction by thereto pivotally operable axles 225 and 226 affixed to links 227 and 228 respectfully with opposite end of link 227 affixed to shaft 129 of gearmotor 130 with housing 131 affixed to derailleur linkage input yoke 232 using screws 233 with opposite end of link 228 affixed to axle 234 pivotally operable in derailleur linkage input yoke 232 affixed to mounting bracket 236 serving to affix front derailleur assembly 11 to bicycle framework. Extension spring 238 with hook ends longitudinally retained and thereby serving to draw axles 225 and 234 closer together serves to bias position of chain guiding assembly 221 to one of position extremities thereby serving as take up means for accumulative backlash in gearing of servo gearmotor 130.

Alternate Shifter Embodiment Construction—FIGS. 15, 16, 17A, 17B, 18A & 18B

With reference to FIGS. 15, 16, 17A, 17B, 18A & 18B, alternate powertrain embodiment 300 of the bicycle shifter and user interface of the present invention comprises rear derailleur assembly 510 energized by linear actuator 310 through cable assembly 312, front derailleur assembly 611 energized by linear actuator 310 through cable assembly 312, and chain movement sensor 12 serving to provide signal to control system 13 (not shown in FIGS.) confirming that shifting is possible.

Figure 16:
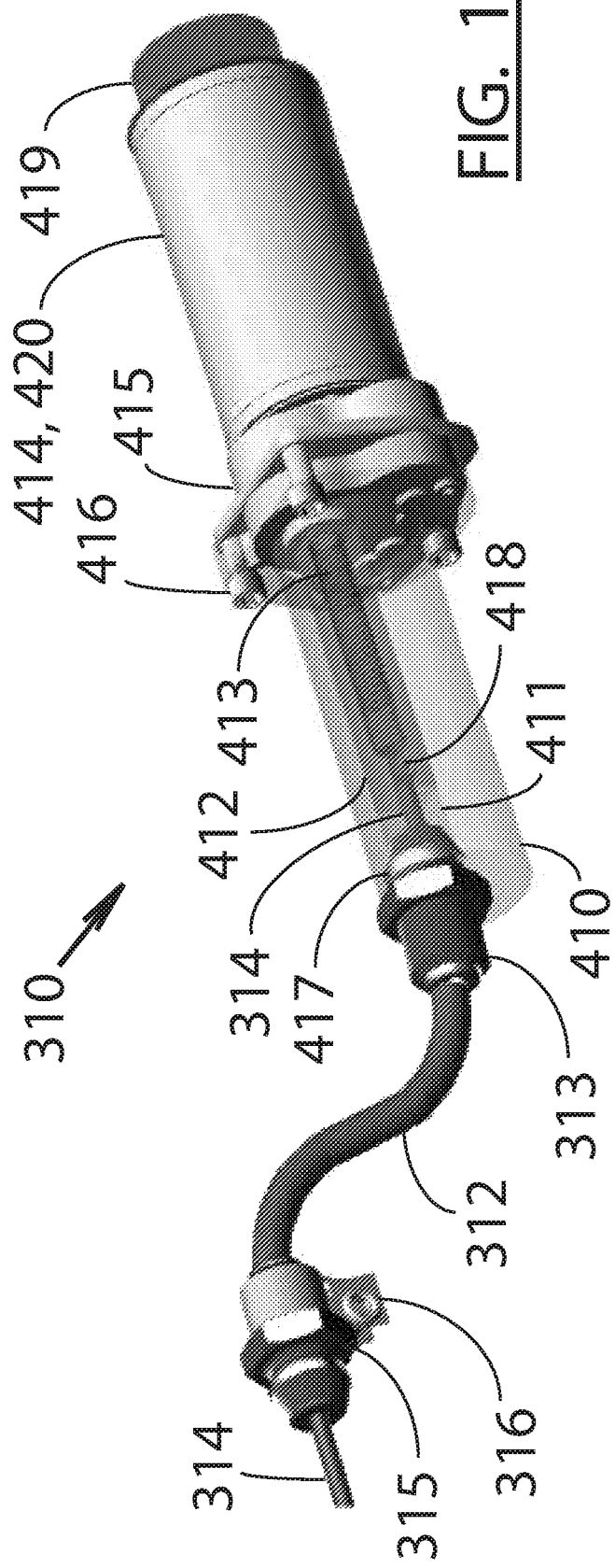
FIG. 16 is a perspective view of the linear actuator employed in the alternate embodiment of the automatic bicycle shifter and user interface of the present invention.

Alternate Shifter Embodiment Linear Actuator—FIG. 16

With reference to FIG. 16, linear actuator 310 of the alternate embodiment 300 of the automatic bicycle shifter and user interface of the present invention comprises housing 410 with rectangular cavity 411 serving as rotational retaining means to slip fitting rectangular nut 412 linearly operable in the axial direction of rectangular cavity 411 about screw 413 rotationally powered by motor 414 acting through high reduction gearing reducer 415 with screws 416 securing reducer 415 thereof to housing 410 additionally including end threaded portion 417 serving to secure fitting 313 of flexible cable assembly 312 with actuation cable 314 secured to rectangular nut 412 by setscrew 418 and with opposite end fitting 315 secured at other end by cable assembly end bracket 316. Encoder 419 attached to free end of armature 420 of motor 414 serves as position encoding means for rectangular nut 412 and consequentially actuation cable 314 through accurate count of revolutions of armature 420 of motor 414.

Figures 17A, 17B:
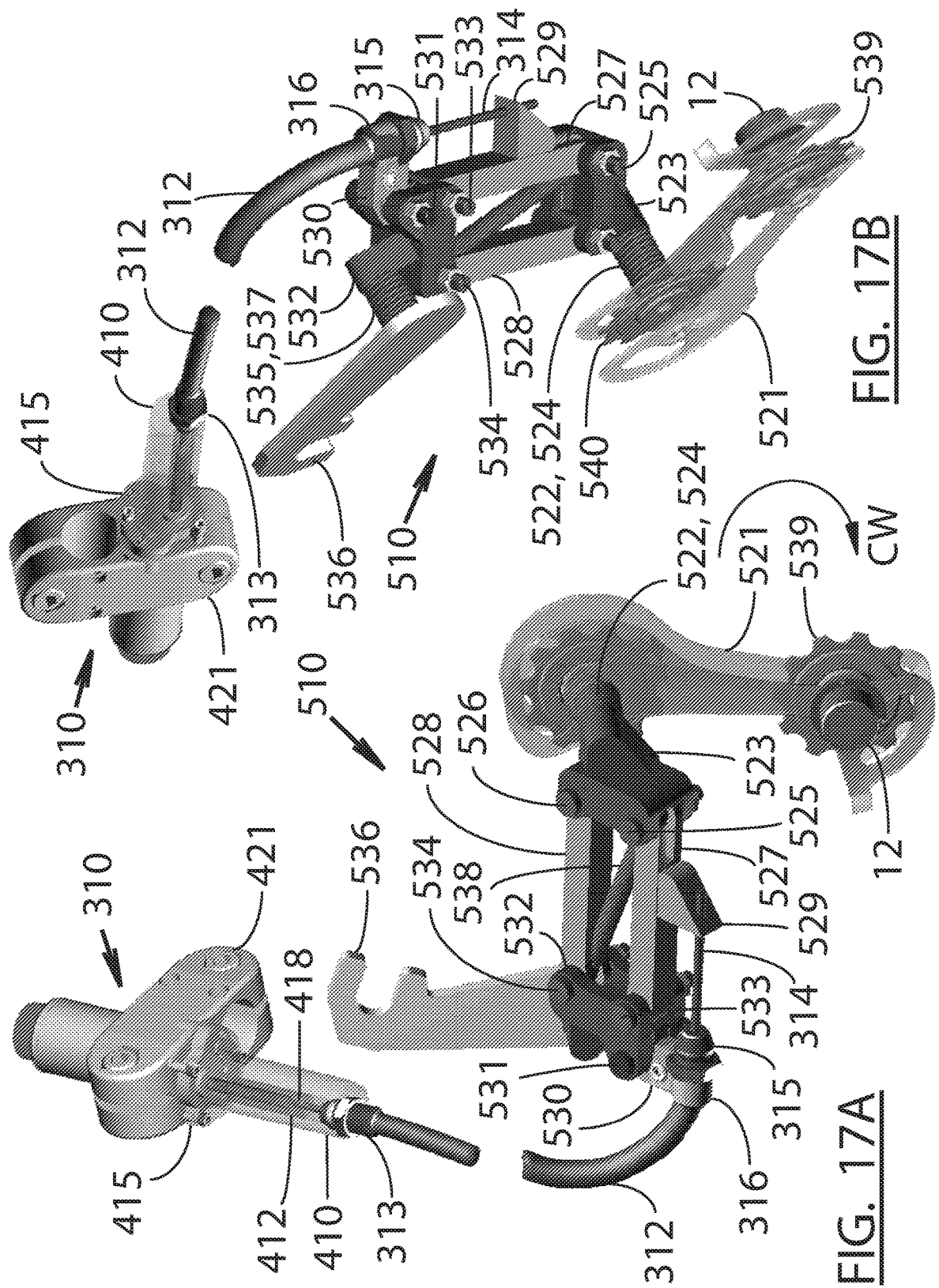
FIG. 17A is a perspective view of the rear derailleur of the alternate embodiment of the automatic bicycle shifter and user interface of the present invention.
FIG. 17B is a perspective view of the rear derailleur of the alternate embodiment of the automatic bicycle shifter and user interface of the present invention taken from an opposite direction to FIG. 17A.

Alternate Embodiment Rear Derailleur—FIGS. 17A & 17B

With reference to FIGS. 17A & 17B, rear bicycle derailleur assembly 510 of alternate embodiment 300 of the automatic bicycle shifter and user interface of the present invention comprises chain guiding assembly 521 affixed to axle 522 pivotally operable about bicycle linkage output yoke 523 and energized in the clockwise direction (FIG. 17A—CW) by torsion spring 524 with ends retained thereto and to derailer linkage output yoke 523 energized in the lateral direction by thereto pivotally operable axles 525 and 526 affixed to power link 527 and idler link 528 respectively with midsection of power link 527 bearing lateral extension 529 serving to affix rear derailleur end of actuation cable 314 of flexible cable assembly 312 with cable assembly end bracket 316 serving to secure end fitting 315 to fixed wing bracket 530 affixed to input yoke 532 by anti-rotation axle 531 with fitting 313 of opposite end of cable assembly 312 affixed to housing 410 of linear actuator 310 with respective end of actuation cable 314 secured to linear actuator rectangular nut 412 by setscrew 418 with linear actuator 310 secured to bicycle framework by mount 421 thereby serving as actuation means for rear derailleur assembly 510 through actuation connection at fixed wing bracket 530 at input yoke 532 additionally pivotally retaining power link 527 and idler link 528 through thereto affixed axles 533 and 534 respectively with derailleur linkage input yoke 532 additionally pivotally operable about axle 535 affixed to bicycle rear framework mounting bracket 536 and energized in the clockwise direction (FIG. 17A—CW) by means of thereto attached torsion spring 537 with opposite end thereof affixed to mounting bracket 536. Extension spring 538 with hook ends longitudinally retained and thereby serving to draw axles 525 and 534 closer together serves to bias position of chain guiding assembly 521 to extreme position in the lateral direction thereby serving as take up means for accumulative backlash in gearing of reducer 415 of linear actuator assembly 310 as well as derailleur actuation means in reverse direction as linear actuator 310 can serve as adequate powering means only in direction consistent with pulling cable 314 and not vice-versa. Chain guiding assembly 521 serves as chain guiding means through two captive idler sprockets 539 and 540 with constant engagement with drive chain 19 with sprocket 539 rotatably affixed to chain sensor 12 serving to sense forward chain motion through polarity of signal produced thereof in order to relay to control system 13 (not shown in FIGS.) when shifting is possible.

Figures 18A, 18B:
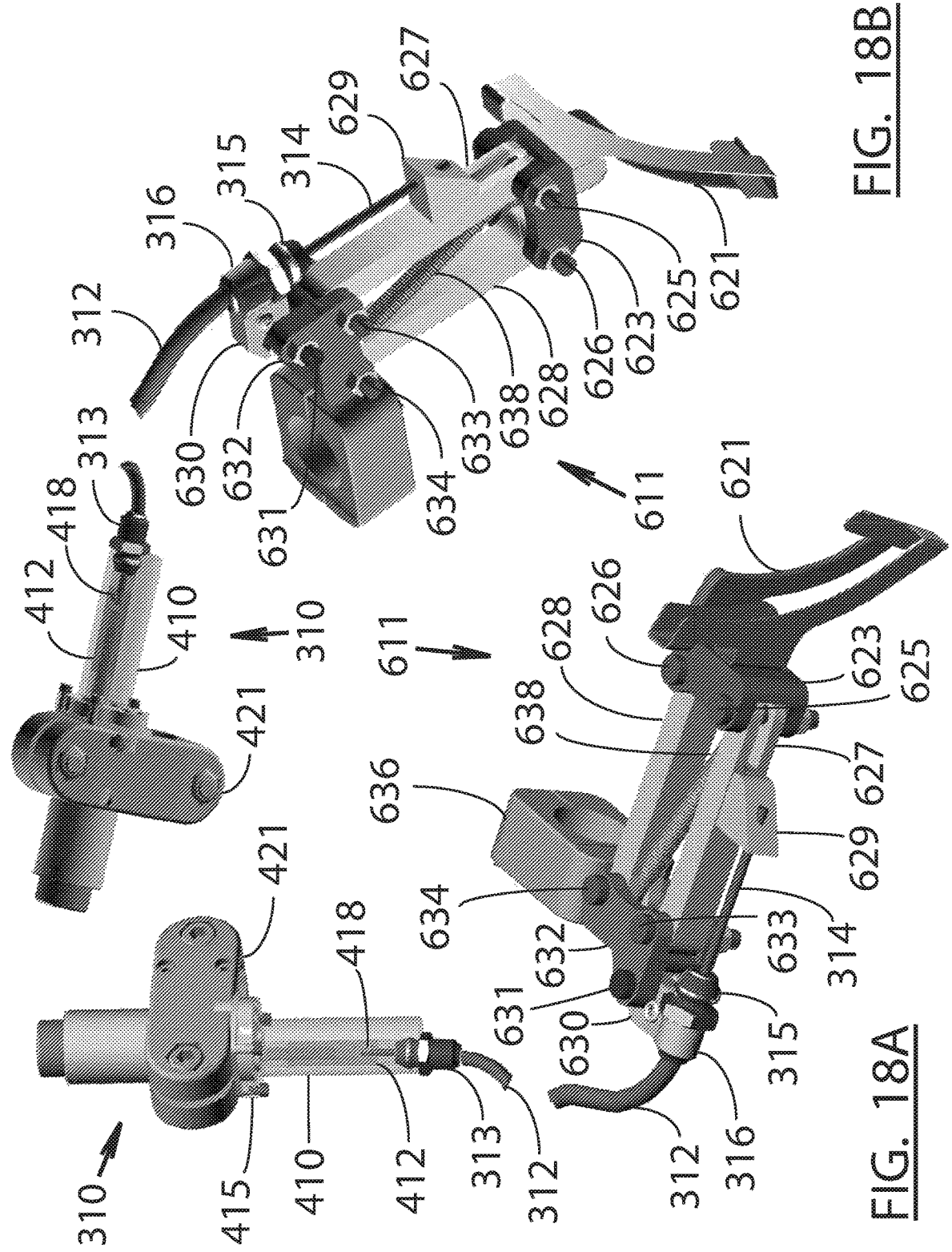
FIG. 18A is a perspective view of the front derailleur of the alternate embodiment of the automatic bicycle shifter and user interface of the present invention.
FIG. 18B is a perspective view of the front derailleur of the alternate embodiment of the automatic bicycle shifter and user interface of the present invention taken from an opposite direction to FIG. 18A.

Alternate Embodiment Front Derailleur—FIGS. 18A & 18B

With reference to FIGS. 18A & 18B, front bicycle derailer assembly 611 of alternate embodiment 300 of the automatic bicycle shifter and user interface of the present invention comprises caging assembly 621 affixed to bicycle linkage output yoke 623 serving to align chain 19 with selected sprocket of front sprocket assembly 22 (not shown in FIGS.) through action of output yoke 623 energized in the lateral direction by thereto pivotally operable axles 625 and 626 affixed to power link 627 and idler link 628 respectfully with midsection of power link 627 bearing lateral extension 629 serving to affix derailleur end of actuation cable 314 of flexible cable assembly 312 with cable assembly end bracket 316 serving to secure end fitting 315 to fixed wing bracket 630 affixed to input yoke 632 by anti-rotation axle 631 with fitting 313 of opposite end of cable assembly 312 affixed to housing 410 of linear actuator 310 with respective end of actuation cable 314 secured to linear actuator rectangular nut 412 by setscrew 418 with linear actuator 310 secured to bicycle framework by mount 421 thereby serving as actuation means for front derailleur assembly through actuation connection at fixed wing bracket 630 at input yoke 632 additionally pivotally retaining power link 627 and idler link 628 through thereto affixed axles 633 and 634 respectively with derailleur linkage input yoke 632 affixed to mounting bracket 636 serving to affix front derailleur assembly 611 to bicycle framework. Extension spring 638 with hook ends longitudinally retained and thereby serving to draw axles 625 and 634 closer together serves to bias position of chain guiding assembly 621 to extreme position in the lateral direction thereby serving as take up means for accumulative backlash in gearing of reducer 415 of linear actuator assembly 310 as well as derailleur actuation means in reverse direction as linear actuator 310 can serve as adequate powering means only in direction consistent with pulling cable 314 and not vice-versa.

The invention claimed is:
1. A touchscreen display for programming and operation of an automatic bicycle shifter and user interface apparatus comprising:
   a) an electrically powered bicycle drive chain derailleur including a gearmotor with a rotational position encoder,
   b) said bicycle drive chain in constant engagement with one of a plurality of concentric to a common axis power transmission drive sprockets,
   c) said electrically powered touchscreen display including status windows, selection and command tactile buttons and a tactile sliding control bar for level adjustment thereof,
   d) said electrically powered touchscreen display including a "teach mode" user interface and selection button, a "programming mode" user interface and selection button, and an "operation mode" user interface and selection button,
   e) an electronic control system including a bidirectional data communication means to said electrically powered touchscreen display, a data connection to said rotational position encoder and a connection to a servo motor controller means for actuation of said electrically powered bicycle drive chain derailleur,
   f) a bicycle propelled power regeneration means with a hardwire connection to said electronic control system,
   g) said "teach mode" user interface including a user prompt window for user guidance through "teaching" of said derailleur, definition buttons and display windows for entry of number of said power transmission bicycle drive sprockets for said derailleur, a "teach position" display window depicting sequential selection for "teaching" from amongst said entered number of said power transmission bicycle drive sprockets for said derailleur, "shift in" and "shift out" buttons for positioning of said derailleur into accurate alignment with said sequential "teach position" selection from amongst said power transmission bicycle drive sprockets for said derailleur, a "set" button for saving taught position of said derailleur for said "teach position" selection from amongst said power transmission bicycle drive sprockets, a bicycle speed display and speed units selection buttons,
   h) said "programming mode" user interface including a user prompt window for user guidance through "programming" of said derailleur, a "shift speed" position display window depicting selection to "program" from amongst said entered number of said power transmission bicycle drive sprockets for said derailleur, "shift up" and "shift down" buttons for engagement of said derailleur with desired selection from amongst said power transmission bicycle drive sprockets for programming of respective "shift speed", "set" button for programming of shifting speed threshold for said "shift speed" selection from amongst said power transmission bicycle drive sprockets, a shifter position display, a bicycle speed display, speed units selection buttons, an active program display, a save program button, and a recall program button, and i) said "operation mode" user interface available in real time including "manual" and "automatic mode" operation selection buttons for said derailleur, position override "shift up" and "shift down" buttons for forcing an alternate selection for "operation" from amongst said power transmission bicycle drive sprockets for said derailleur, a bicycle speed display, speed units selection buttons, an active program display, a save program button, a recall program button, a trip distance display, an odometer display, a time display, a date display, a temperature display, and a "bias" touchscreen sliding control bar for definition of attenuation level of defined speed shifting thresholds for said derailleur, Whereby a comprehensive touchscreen display for programming and operation of an automatic bicycle shifter and user interface including said user "teach mode" interface serving to define number of available positions and positional settings for said derailleur, said user "programming mode" serving to define said shifting speed thresholds for said programmed positions for said derailleur, said user "operation mode" serving to present the user with status of said bicycle and said derailleur in real time, permits the user to select said mode of operation for said derailleur, and enables the user to alter said programmed shifting speed thresholds for said derailleur in real time, thereby offering the user a total solution permitting continually adaptable control of said bicycle facilitating safe control and ergonomic operation throughout riding experience.

2. The touchscreen user interface of claim 1 wherein said control system is hardwired to an inclinometer affixed to frame of said bicycle and producing a voltage potential output in predefined relation to road inclination with said control system thereof serving to bias said shifting speed thresholds of said programmed positions for said derailleur according to a predefined relation.

3. The touchscreen "operation mode" user interface of claim 2 further including a touchscreen sliding control bar enabling attenuation of said bias of said programmed shifting speed thresholds of said programmed positions for said derailleur.

4. The touchscreen user interface of claim 3 and said control system adapted for operation with two bicycle drive chain derailleurs.

5. The touchscreen user interface of claim 4 wherein said number of programmed shift position is the product of said power transmission bicycle drive sprockets.

6. The touchscreen user interface of claim 1 and said control system adapted for operation with two bicycle drive chain derailleurs.

7. The touchscreen user interface of claim 6 wherein said number of programmed shift position is the product of said power transmission bicycle drive sprockets.

8. The touchscreen user interface of claim 1 adapted for operation on a mobile phone through a custom application program interfacing with said control system through a WIFI application communicating with said control system augmented with a WIFI transceiver.

9. A user interface for programming and operation of a power bicycle shifter comprising:
   a) a bicycle rear wheel hub derailleur powered by an electrical gearmotor and including a position encoder,
   b) a bicycle drive chain in constant engagement with one of a plurality of a bicycle rear wheel hub sprockets,
   c) a user interface including a "teach mode" and a thereto selection button, a "programming mode and a thereto selection button, and an "operation mode" and a thereto selection button,
   d) said "teach mode" user interface including a user prompt window for guidance through teaching of said rear wheel hub derailleur, a definition buttons and a display window for entry of number of said rear wheel hub sprockets for said rear wheel hub derailleur, a "teach position" display of sequential derailleur position selection to teach from amongst said entered number of rear wheel hub sprockets, an "inch in" button and an "inch out" button for positioning of said rear wheel hub derailleur into accurate alignment with said sequential derailleur position selection, and a "position set" button for saving taught position of said sequential derailleur position selection,
   e) said "programming mode" user interface including a user prompt window for guidance through programming of said rear wheel hub derailleur, a "shift position" display of sequential derailleur shift speed selection to set from amongst said entered number of rear wheel hub sprockets, a "shift up" button and a "shift down" button for selection of said sequential derailleur shift speed selection, a "speed set" button for definition of shifting thresholds for said sequential derailleur shift speed selection, and
   f) said "operation mode" user interface including a user prompt window, a "manual mode" and an "automatic mode" operation selection buttons for said rear wheel hub derailleur, a position override "shift up" and "shift down" buttons for said rear wheel hub derailleur, and a bias attenuation sliding control bar for said shifting thresholds of said rear wheel hub derailleur, Whereby a comprehensive user interface for teaching, programing and operation of a power bicycle shifter including said user "teach mode" interface serving to define number of available positions and positional settings for said rear wheel hub derailleur, said user "programming mode" serving to define said shifting thresholds for said sequential derailleur shift speed selection of said rear wheel hub derailleur, said user "operation mode" serving to present a user with the status of said rear wheel hub derailleur, permitting said user to select said mode of operation for said rear wheel hub derailleur, and enabling said user to alter in real time said shifting thresholds for said rear wheel hub derailleur, and thereby offering said user a total solution permitting continually adaptable control of said rear wheel hub derailleur in real time facilitating safe control and ergonomic operation of a bicycle.

10. The user interface of claim 9 further adapted for operation with a second electric drive chain derailleur, disposed at pedals of said bicycle, with said bicycle drive chain thereof in constant engagement with one of a plurality of pedals sprockets, and whereby said sequential derailleur position selection of said "teach mode" additionally includes selections for said second electric drive chain derailleur and said sequential shift speed selections of said "programming mode" additionally includes desired combinations of said taught positions of said rear wheel hub derailleur and said second electric drive chain derailleur.

11. The user interface of claim 9 further adapted to interface with an inclinometer with said "operation mode" further including a sliding control bar for alteration of respective preprogrammed shifting thresholds attenuation criteria of said rear wheel hub derailleur in real time.

12. The user interface of claim 9 further including capability to define, save and run multiple shifting programs through an active program display window, a program selection button, a save program button, and a recall program button.

13. The user interface of claim 10 further adapted to interface with an inclinometer with said "operation mode" further including a sliding control bar for alteration of respective preprogrammed shifting thresholds attenuation criteria of said rear wheel hub derailleur in real time.

14. The user interface of claim 10 further tethered and integrated to manual "shift up" and "shift down" electric switches disposed at handlebars of said bicycle for each of said rear wheel hub derailleur and said second electric drive chain derailleur.

15. The user interface of claim 9 wherein said "operation mode" further includes a bicycle speed display, a speed unit selection button, a trip distance display, a bicycle odometer display, a time display, a date display, and a temperature display.

16. A user interface for programming and operation of a manually controlled power bicycle shifter comprising:
   a) a bicycle rear wheel hub derailleur powered by an electrical gearmotor and including a position encoder,
   b) a bicycle drive chain in constant engagement with one of a plurality of a bicycle rear wheel hub sprockets,
   c) a user interface including a "teach mode" and a thereto selection button and an "operation mode" and a thereto selection button,
   d) said "teach mode" user interface including a user prompt window for guidance through teaching of said rear wheel hub derailleur, a definition buttons and a display window for entry of number of said rear wheel hub sprockets for said rear wheel hub derailleur, a "teach position" status window for display of sequential derailleur position selection to teach from amongst said entered number of rear wheel hub sprockets, an "inch in" button and an "inch out" button for positioning of said rear wheel hub derailleur into accurate alignment with said sequential derailleur position selection, and a "position set" button for saving taught position of said sequential derailleur position selection, and
   e) said "operation mode" user interface including a user prompt window, a position "shift up" and "shift down" buttons for said rear wheel hub derailleur,
   Whereby a comprehensive user interface for teaching and operation of a manually operated power bicycle shifter including said user "teach mode" interface serving to define number of available positions and positional settings for said rear wheel hub derailleur, said user "operation mode" serving to present to said user with the status of said rear wheel hub derailleur, enabling said user to arbitrarily shift up and shift down position of said rear wheel hub derailleur, and thereby offering said user a total solution permitting continually adaptable control of said rear wheel hub derailleur in real time facilitating safe control and ergonomic operation of a bicycle.

17. The user interface of claim 16 further adapted for operation with a second electric drive chain derailleur, disposed at pedals of said bicycle, with said bicycle drive chain thereof in constant engagement with one of a plurality of pedals sprockets, and whereby said sequential derailleur position selection of said "teach mode" additionally includes selections for said second electric drive chain derailleur and with said user interface further provided with a "programming mode" additionally serving to define desired shift combinations of said taught positions of said rear wheel hub derailleur and said second electric drive chain derailleur.

18. The user interface of claim 16 adapted to operate on a mobile phone through a WIFI application.

19. The user interface of claim 16 further tethered and integrated to manual "shift up" and "shift down" electric switches disposed at handlebars of said bicycle.

20. The user interface of claim 17 further tethered and integrated to manual "shift up" and "shift down" electric switches disposed at handlebars of said bicycle for each of said rear wheel hub derailleur and said second electric drive chain derailleur.

21. The user interface of claim 16 wherein said "operation mode" further includes a bicycle speed display, a speed unit selection button, a trip distance display, a bicycle odometer display, a time display, a date display, and a temperature display.

22. The process of for teaching, programming and operation of a power bicycle shifter comprising:
   a) providing a bicycle with a rear wheel hub derailleur powered by an electrical gearmotor and including a position encoder,
   b) providing said bicycle with a bicycle drive chain in constant engagement with one of a plurality of a bicycle rear wheel hub sprockets,
   c) providing said bicycle with a user interface means permitting a rider to teach said rear wheel hub derailleur various shift positions through a "teach mode" screen, program define speed shifting thresholds of said rear wheel hub derailleur through a "programming mode screen, and operate said rear wheel hub derailleur through an "operation mode" screen,
   d) providing said "teach mode" user interface with capability for guidance of said rider through teaching of said number of said rear wheel hub sprockets and alignment positions thereof of said rear wheel hub derailleur,
   e) providing said "programming mode" user interface with capability for guidance of said rider in programming of speed shifting thresholds for said rear wheel hub derailleur, and
   f) providing said "operation mode" user interface with a position override means and a bias attenuation means for said shifting thresholds of said rear wheel hub derailleur,
   Whereby said rider conditions said bicycle for proper operation by defining number of available positions and positional settings for said rear wheel hub derailleur through said "teach mode", defines said shifting thresholds for said rear wheel hub derailleur through said "programming mode", selects in real time said mode of operation and said shifting thresholds bias for said rear wheel hub derailleur through said "operation mode", and thereby operates said bicycle in a continually adaptable fashion facilitating safe and total control over said rear wheel hub derailleur.

23. The process for teaching, programming and operation of a power bicycle shifter of claim 22 including a second electric drive chain derailleur disposed at pedals of said bicycle, wherein said "teach mode" is provided with additional capability permitting said rider to define number of pedals sprockets and derailleur positions settings thereof, said "programming mode" is provided with additional capability permitting said rider to define shift combinations of said rear wheel hub derailleur and said second electric drive chain derailleur and speed shifting thresholds thereof, and said "operation mode" is provided with additional capability to operate said second electric drive chain derailleur in conjunction with said rear wheel hub derailleur.

24. The process for teaching, programming and operation of a power bicycle shifter of claim 22 wherein said rider is provided with auxiliary manual "shift up" and "shift down" electric switches disposed at handlebars of said bicycle serving as additional controls to said user interface.

25. The process for teaching, programming and operation of a power bicycle shifter of claim 1 wherein said rider uses auxiliary manual "shift up" and "shift down" electric switches disposed at handlebars of said bicycle for each of said rear wheel hub derailleur and said second electric drive chain derailleur.

26. The process for teaching, programming and operation of a power bicycle shifter of claim 23 wherein said "operation mode" further includes a bicycle speed display, a speed unit selection button, a trip distance display, a bicycle odometer display, a time display, a date display, and a temperature display.

27. The process for teaching, programming and operation of a power bicycle shifter of claim 22 wherein said rider is provided with an augmented capability of said "operation mode" to interface with an inclinometer and further including a sliding control bar permitting said rider to attenuate respective preprogrammed shifting thresholds criteria of said rear wheel hub derailleur in real time.

28. The process for teaching, programming and operation of a power bicycle shifter of claim 1 wherein said rider is provided with an augmented capability of said "operation mode" to interface with an inclinometer and further including a sliding control bar permitting said rider to attenuate respective preprogrammed shifting thresholds criteria of said rear wheel hub derailleur in real time.

* * * * *